(12) United States Patent  
Shimoda

(10) Patent No.: US 8,982,680 B1  
(45) Date of Patent: Mar. 17, 2015

(54) DATA ARCHIVE SYSTEM

(71) Applicant: Hitachi—LG Data Storage, Inc., Tokyo (JP)

(72) Inventor: Nozomu Shimoda, Tokyo (JP)

(73) Assignee: Hitachi—LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/472,524

(22) Filed: Aug. 29, 2014

(51) Int. Cl.  
*G11B 17/22* (2006.01)

(52) U.S. Cl.  
CPC ..................... *G11B 17/22* (2013.01)  
USPC ..................... 369/30.28; 369/30.38

(58) Field of Classification Search  
None  
See application file for complete search history.

(56) References Cited

U.S. PATENT DOCUMENTS

| | | | |
|---|---|---|---|
| 2001/0044877 A1* | 11/2001 | Kanazawa et al. | 711/170 |
| 2005/0007898 A1* | 1/2005 | Maeda | 369/30.38 |
| 2010/0217750 A1* | 8/2010 | Tokoro et al. | 707/640 |
| 2010/0265606 A1* | 10/2010 | Thompson et al. | 360/15 |
| 2012/0275281 A1* | 11/2012 | Hirabayashi et al. | 369/30.06 |
| 2013/0077454 A1* | 3/2013 | Shimoda | 369/30.06 |
| 2013/0100786 A1* | 4/2013 | Nishida | 369/30.06 |
| 2013/0132672 A1* | 5/2013 | Kimura et al. | 711/114 |
| 2013/0212428 A1* | 8/2013 | Yamamoto et al. | 714/6.21 |
| 2013/0223197 A1* | 8/2013 | Usui et al. | 369/30.38 |
| 2014/0195039 A1* | 7/2014 | Ichimura et al. | 700/214 |

FOREIGN PATENT DOCUMENTS

| | | |
|---|---|---|
| JP | 2008-287828 A1 | 11/2008 |
| JP | 2014-78287 A1 | 5/2014 |

* cited by examiner

*Primary Examiner* — Thang Tran  
(74) *Attorney, Agent, or Firm* — Baker Botts L.L.P.

(57) ABSTRACT

In a data archive system including plural sets of data library apparatuses and a control unit and an information storing unit connected to the plural sets of data library apparatuses, the data library apparatus includes a recording medium storing unit that stores plural recording media, a data recording and reproducing device that records data in the recording media and reproduces data from the recording media, a recording medium transporting unit that transports the recording media between the recording medium storing unit and the data recording and reproducing device, and a data library apparatus control unit that controls an action of the data library apparatus, the information storing unit stores management information for managing the recording medium storing unit, the control unit controls actions of the total data archive system, and when a recording medium storing unit is attached to the data library apparatus.

9 Claims, 24 Drawing Sheets

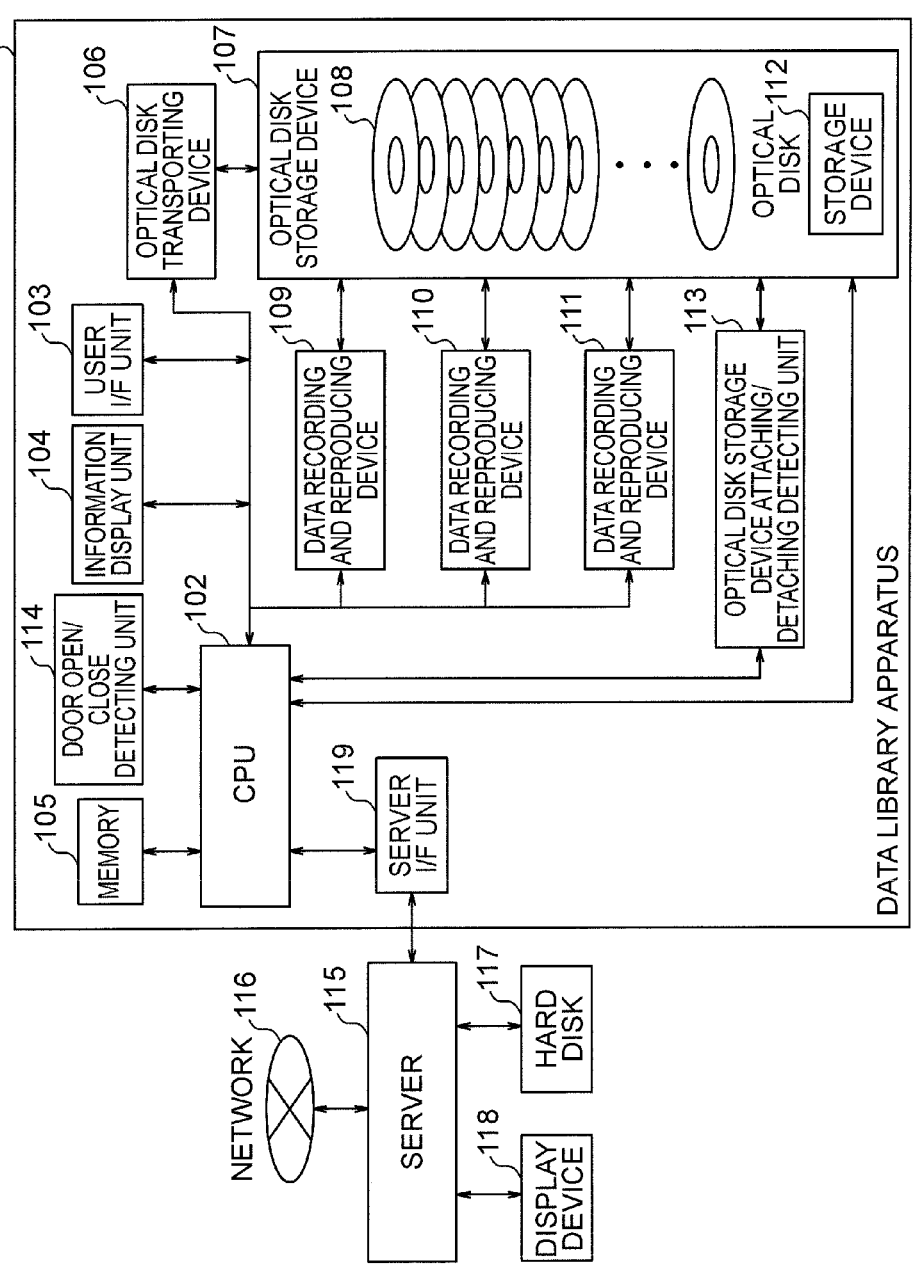

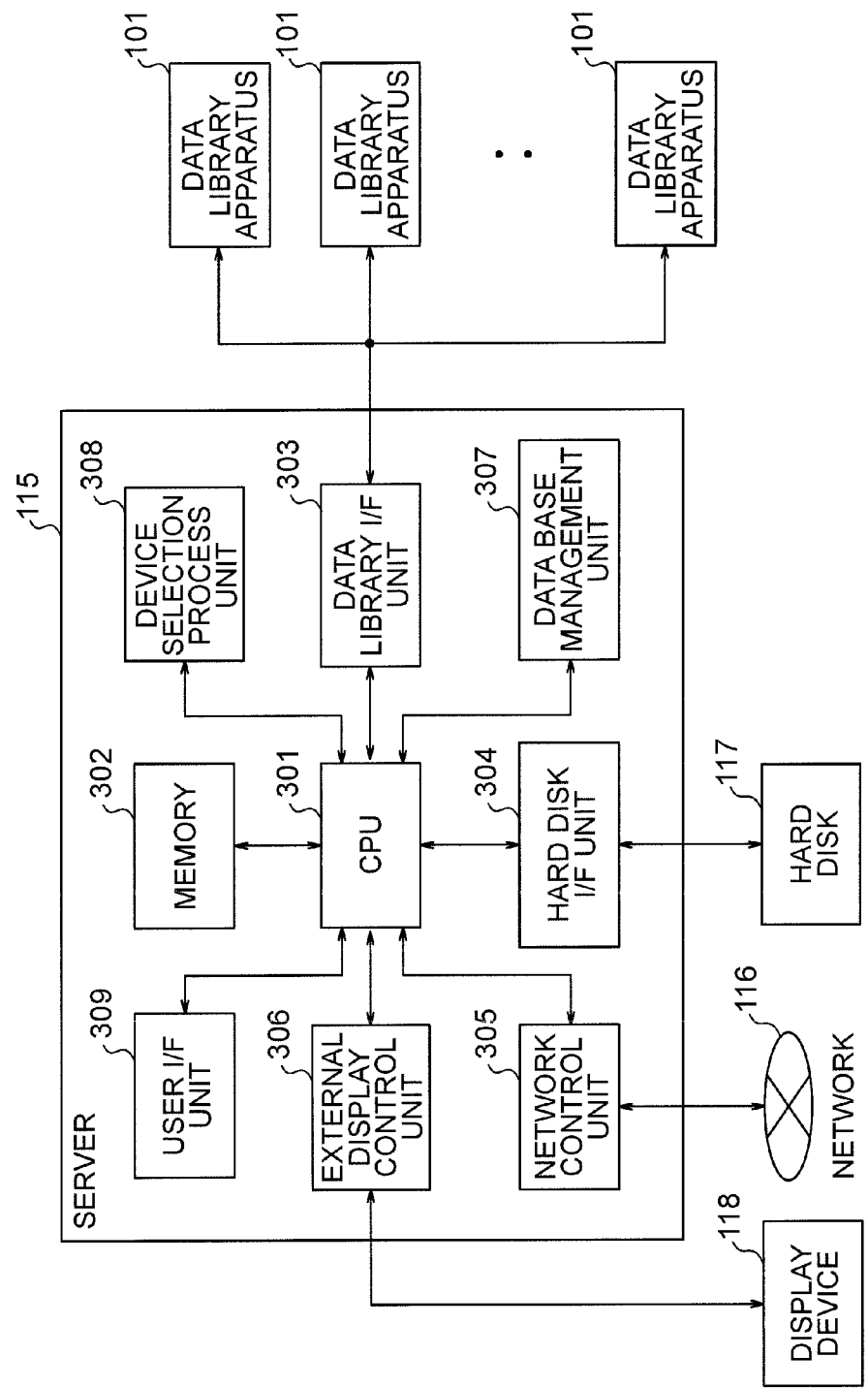

FIG. 11

| Address | Data |
|---|---|
| 0x00000000 | F0F1F2F3F4F5F6F7F8F9FAFBFCFDFEFF |
| 0x00000010 | 01 00 00 00 00 00 00 00 00 00 00 00 00 00 00 00 |
| ⋮ | ⋮ |
| 0x0000FFFF | |

F0F1F2F3F4F5F6F7F8F9FAFBFCFDFEFF — OPTICAL DISK STORAGE DEVICE ID

01 — STORAGE DEVICE USE SITUATION FLAG

FIG. 12

| OPTICAL DISK STORAGE DEVICE BASIC INFORMATION | STORAGE DEVICE ID | 0xF1F2F3F4F5F6F7F8F9FAFBFCFDFEFF | | |
|---|---|---|---|---|
| | DISK | KIND | BD-R TL | NUMBER OF DISKS |
| | | | | 500 |
| INFORMATION ON EACH DISK | DISK #1 | TOTAL FILE NUMBER | | 10,000 |
| | | FILE #1 | FILE PATH | FILE SIZE | TIME STAMP |
| | | ⋯ | ⋯ | ⋯ | |
| | | FILE #10000 | FILE PATH | FILE SIZE | TIME STAMP |
| | DISK #500 | TOTAL FILE NUMBER | | 500,000 |
| | | FILE #1 | FILE PATH | FILE SIZE | TIME STAMP |
| | | ⋯ | ⋯ | ⋯ | |
| | | FILE #500000 | FILE PATH | FILE SIZE | TIME STAMP |

FIG. 18

| Address | Data |
|---|---|
| 0x00000000 | F0F1F2F3F4F5F6F7F8F9FAFBFCFDFEFF |
| 0x00000010 | 01 02 01 02 00 00 00 00 00 00 00 00 00 00 00 00 |
| ⋮ | ⋮ |
| 0x0000FFFF | |

DISK NUMBER OF OPTICAL DISK RECORDING OPTICAL DISK STORAGE DEVICE INFORMATION

NUMBER OF OPTICAL DISKS RECORDING OPTICAL DISK STORAGE DEVICE INFORMATION

DATA ARCHIVE SYSTEM

BACKGROUND OF THE INVENTION

The present invention relates to a data archive system.

As a related art of the present technical field, JP-A-2008-287828 can be cited. In JP-A-2008-287828, there is a description that "In the present invention, by storing an inventory process in starting up in a non-volatile memory mounted on an auto-loader, unless a magnetic tape magazine is discharged, the inventory process of the next time and onward is substituted for reading the magnetic tape information from the non-volatile memory, the inventory process beyond necessity is saved, and thereby an auto-loader capable of suppressing and reducing an adverse effect can be manufactured."

Also, in JP-A-2014-078287, there is a description that "One disk in a disk storage container is made a management disk, and file information for data base is written. When the data base of a server device cannot be used, the file information is read from the management disk, and the data base is reconstructed. The file information of the management disk is updated when the disk storage container is replaced, or at every predetermined period of time. The management disk is stored in a slit positioned farthest from a memory reproducing unit. The management disk is easily distinguished from other disks by providing a bar code for example."

SUMMARY OF THE INVENTION

In JP-A-2008-287828, when the inventory process is executed in order to effect data backup with correct tape information at all times, the result thereof is stored in the non-volatile memory mounted on the auto-loader, unless the tape is discharged, reading the information stored in the non-volatile memory is substituted for the inventory process, and the inventory process is saved, however, saving of the inventory process when replacement of a medium occurs has not been considered.

In JP-A-2014-078287, the backup of the data base of a server device is written in one management disk out of the disks stored in the disk storage container, and the data base is reconstructed from the backup of the data base written in the management disk, however, a manager or a user comes to wait for a certain period of time required for transporting and reading the management disk.

Therefore, the object of the present invention is to provide a data archive system that can be controlled efficiently based on appropriate medium information.

In order to solve the problem, the configurations described in claims for example are employed.

According to the present invention, a data archive system that can be controlled efficiently based on appropriate medium information can be provided.

The problems, configurations and effects other than those described above will be clarified by description on embodiments described below.

BRIEF DESCRIPTION OF THE DRAWINGS

FIG. 1 is a block diagram showing a configuration of a data archive system.

FIG. 3 is a block diagram showing a configuration of a server in the data archive system.

FIG. 11 is a drawing showing an example of information stored in a storage device of the optical disk storage device.

FIG. 12 is a drawing showing an example of information on the optical disk storage device and all internal optical disks registered on the data base.

FIG. 18 is a modification of information stored in a storage device of an optical disk storage device.

DETAILED DESCRIPTION OF THE EMBODIMENTS

Figure 2A:
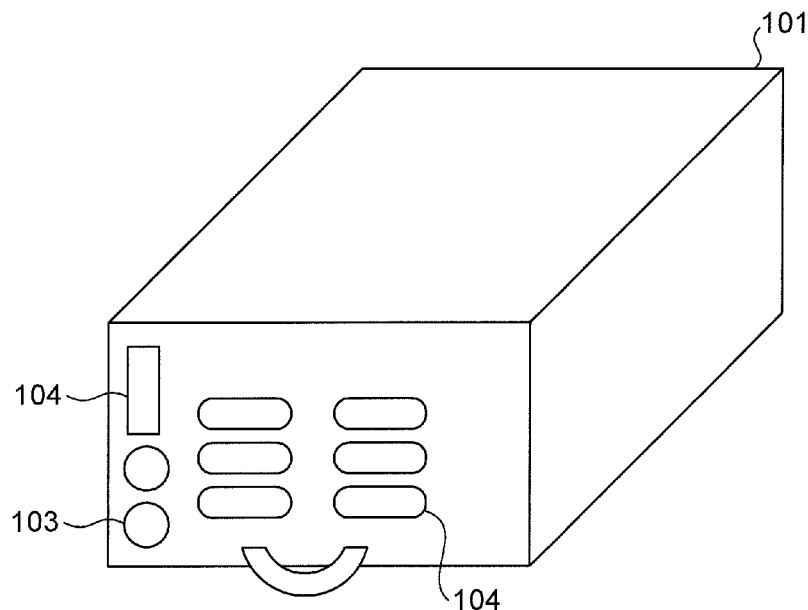
FIG. 2A is an outside drawing (front view) of a data library apparatus.

FIG. 1 is a block diagram showing a configuration of a data archive system. 101 is a data library apparatus, and in recording, the data library apparatus receives data recording a command from a server 115, receives data, and records the received data in an optical disk 108. In reproducing, the data is reproduced from the optical disk 108, and the data is delivered to the server 115.

102 is a CPU (Central Processing Unit) of the data library apparatus, controls an optical disk transporting device 106 at a request from the server 115, selects a desired optical disk out of plural sheets of the optical disks 108 stored in an optical disk storage device 107, and sends the same to data recording and reproducing devices 109, 110, 111. Also, the CPU 102 controls the optical disk transporting device 106, receives the optical disk 108 from the data recording and reproducing devices 109, 110, 111, and stores the optical disk at a predetermined position inside the optical disk storage device 107. Further, the CPU 102 reads/writes information from/in a storage device 112, acquires information detected by an optical disk storage device attaching/detaching detecting unit 113 and a door open/close detecting unit 114, and executes control based on the acquired information.

103 is a user interface unit, and provides a means such as various switches and the like for allowing a user to operate the data library apparatus. 104 is an information display unit, and displays various information such as an operational status of the data library apparatus by a liquid crystal display and an LED (Light Emitting Diode). 105 is a memory and stores various programs and information, and a program and setting information for example for controlling the CPU 102 of the data library apparatus are also stored in the memory 105.

106 is the optical disk transporting device, is controlled by the CPU 102 of the data library apparatus, takes out the optical disk 108 from the optical disk storage device 107, transports the same, and loads the same on the data recording and reproducing devices 109, 110, 111. Alternatively, the optical disk transporting device 106 receives the optical disk 108 from the data recording and reproducing devices 109, 110, 111, transports the same, and stores the same in the optical disk storage device 107.

107 is the optical disk storage device and includes plural optical disks 108. Also, the optical disk storage device 107 is detachable, can be taken out to outside the data library apparatus as a whole when recording of data in all optical disks has been completed, and another optical disk storage device storing unrecorded disks can be taken in to inside the data library apparatus instead and so on for example.

Further, although only one set of the optical disk storage device 107 is illustrated in FIG. 1, plural sets may be provided inside the data library apparatus, and it is possible to use them differently according to the use, for example, one for an unrecorded disk storage device and the other for a recorded disk storage device, and so on, or alternatively, to use them differently according to the kind of the disk, one for a disk recordable on one surface and the other for a disk recordable on both surfaces, and so on. It is a matter of course that the inside of the optical disk storage device 107 can be divided into an unrecorded disk storage region and a recorded disk storage region.

108 are optical disks, and plural sheets thereof are stored inside the optical disk storage device 107. In recording data, the optical disk is taken out from the optical disk storage device 107 by the optical disk transporting device 106, is loaded on the data recording and reproducing devices 109, 110, 111, and, when data recording has been completed, is returned to the optical disk storage device 107 by the optical disk transporting device 106. On the other hand, in reproducing data, the optical disk 108 is taken out from the optical disk storage device 107 by the optical disk transporting device 106, is loaded on the data recording and reproducing devices 109, 110, 111, reproduces the data, and, when data reproduction has been completed, is returned to the optical disk storage device 107 by the optical disk transporting device 106. 109, 110, 111 are data recording and reproducing devices, are controlled by the CPU 102 of the data library apparatus, and executes data recording in the optical disk 108 or data reproducing from the optical disk 108. Further, although three sets of the data recording and reproducing devices are mounted on the data library apparatus in FIG. 1, the number of sets mounted is not limited, and 6 sets of the data recording and reproducing devices and so on may be mounted for example.

112 is a storage device included in the optical disk storage device, and stores information related to the optical disk storage device and information required for controlling the optical disk storage device.

113 is the optical disk storage device attaching/detaching detecting unit, detects attaching/detaching of the optical disk storage device 107, and transmits the detected information to the CPU 102. 114 is a door open/close detecting unit, detects opening/closing of the door included in the data library apparatus, and transmits the detected information to the CPU 102.

Figure 2B:
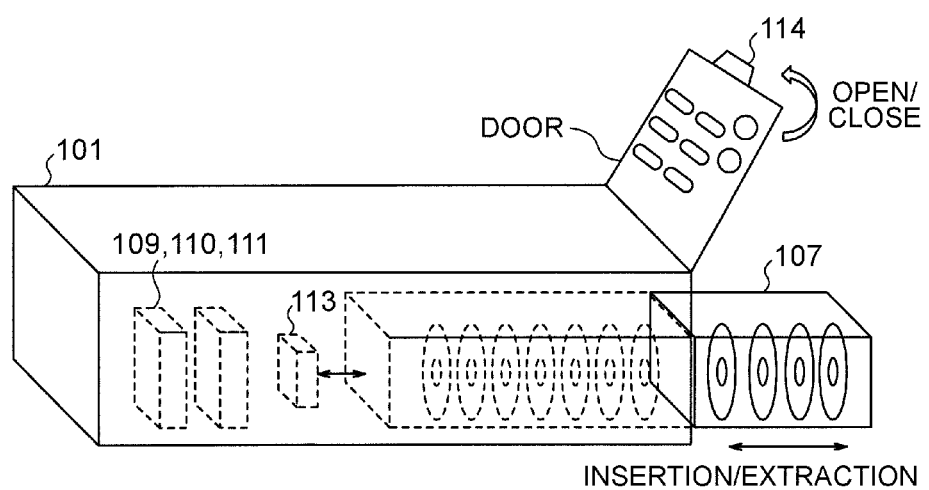
FIG. 2B is an outside drawing (side view) of the data library apparatus.

In FIG. 2, an outside drawing of the data library apparatus is shown. FIG. 2A is a front view, and FIG. 2B is a side view.

The server 115 makes the data library apparatus execute data recording and reproducing control by communication with the CPU 102 of the data library apparatus 101, and executes data management through a hard disk 117, information display through a display device 118, and data and information transmitting and receiving control with respect to other equipment connected through a network 116. 116 is a network, and plurality of servers, data library apparatuses and the like are connected thereto. 117 is a hard disk, and accumulates data and information related to control of the data archive system. 118 is a display device, and displays information related to the server or the data library apparatus and the hard disk connected to the server. 119 is a server interface unit, and executes control related to transmitting and receiving of data between the CPU 102 of the data library apparatus and a CPU 301 of the server 115.

FIG. 3 is a block diagram showing a configuration of the server in the data archive system. It is configured that, to the server 115, one set or more of the data library apparatuses 101, the network 116, the hard disk 117 and the display device 118 are connected.

301 is a CPU of the server 115, and, in recording data, records data received from the network 116 through a network control unit 305 in the hard disk 117 through a hard disk interface unit 304. Alternatively, the CPU 301 controls the data library apparatus through a data library interface unit 303, and records data in the optical disk built in the data library apparatus. In reproducing the data, the CPU 301 reads the data from the hard disk 117 through the hard disk interface unit 304, and transmits the read data to the network 116 through the network control unit 305. Alternatively, the CPU 301 controls the data library apparatus through the data library interface unit 303, reproduces the data from the optical disk built in the data library apparatus, receives the reproduced data, and transmits the received data to the network 116 through the network control unit 305.

Also, the CPU 301 appropriately processes, records and manages various information received from the data library apparatus, reproduces the information, determines a control policy based on the information reproduced, and executes actual control. Further, the CPU 301 displays the information on the display device 118 through an external display control unit 306.

302 is a memory, and programs and various information for controlling the CPU 301 of the server 115 are recorded therein. Also, the memory 302 records thermal information and vibration information inside the data library apparatus transmitted from the data library apparatus 101 as well as characteristics information of the respective data recording and reproducing devices built in the data library apparatus.

303 is a data library interface unit, and executes control related to transmitting and receiving of data between the data library apparatus 101 and the CPU 301 of the server 115. Further, although plural sets of data library apparatus are connected to one data library interface unit in the drawing, it may be configured that plural sets of data library apparatus are connected through a network for example.

304 is a hard disk interface unit, and executes data transmission to the hard disk 117 in accordance with the standards such as SATA (Serial Advanced Technology Attachment) and the like. 305 is the network control unit, and executes control related to transmitting/receiving of data between the network 116 and the CPU 301 of the server 115.

307 is a data base management unit, and controls access to the data base in which various information used for controlling the data archive system has been recorded. More specifically, the data base management unit 307 executes the process such as registering information on the data base, reading out and retrieving the registered information, and the like. In the present example, description will be made assuming that the data base is present in the hard disk 117. It is a matter of course that the data base may exist in a device other than the hard disk 117, for example in the memory 302. Also, the data base management unit 307 of the present example executes determination whether creation of new data base or updating of the data base is required for controlling the system, and determination which information is to be registered in the data base, and essential operation and management of the data base are to be left to the CPU 301. However, the present invention is not limited to it, and essential operation and management of the data base may be executed in the data base management unit 307.

308 is a device selection process unit, and executes determination and selection that any of one or more sets of data library apparatus connected to the server is to be used in recording and reproducing the data, and determination and selection that any of one or more sets of data recording and reproducing device built in the selected data library apparatus is to be used.

309 is a user interface unit, and provides a means for allowing a user to control the server based on various information displayed on the display device 118, and to control respective data library apparatuses through the server.

Figure 4:
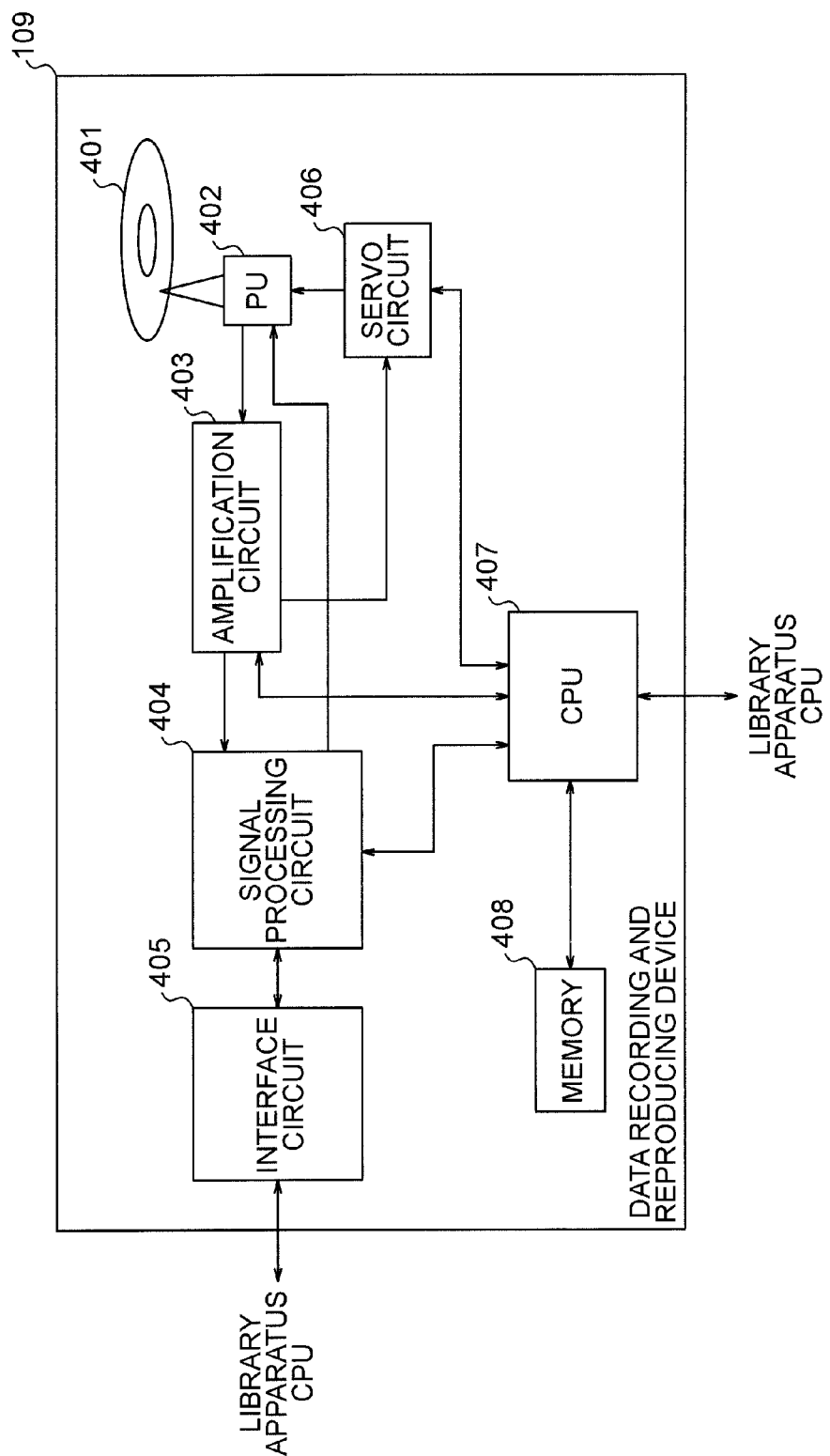
FIG. 4 is a block diagram showing a configuration of a data recording and reproducing device.

FIG. 4 is a block diagram showing a configuration of the data recording and reproducing device.

407 is a CPU, and executes control of a recording process and a reproducing process of the data recording and reproducing devices 109. Also, instead of the CPU, an optional circuit capable of similar control may be used. Further, in starting the recording process or the reproducing process of the data recording and reproducing device, the CPU 407 starts collection of the load information of each block managed by itself, in finishing the recording process or the reproducing process, records the collected information in the memory, and outputs the recorded information to the CPU 102 of the data library apparatus. 401 is a data recording medium, for example BD-R (Blu-ray Disc Recordable). Also, 401 will be referred to simply as an optical disk 401 in the description below. Further, the data recording medium is not necessarily limited to an optical disk, and it may be a recording medium such as a magneto-optical disk, hologram and the like.

402 is an optical pickup, reads a signal from the optical disk 401, and transmits the same to an amplification circuit 403. Also, the optical pickup 402 records a modulation signal transmitted from a signal processing circuit 404 in the optical disk 401. 403 is an amplification circuit, amplifies a reproducing signal read from the optical disk 401 through the optical pickup 402, and transmits the same to the signal processing circuit 404. Also, the amplification circuit 403 creates a servo signal and transmits the same to a servo circuit 406.

404 is the signal processing circuit, demodulates an input signal, and transmits data after correction of error and so on to an interface circuit 405. Also, the signal processing circuit 404 adds error correction marks to the data transmitted from the interface circuit 405 and so on, and modulates and transmits the data to the optical pickup 402. 405 is an interface circuit, and executes a data transfer process in accordance with SATA for example or other transfer methods. In transferring the data, the data transmitted from the signal processing circuit 404 are transmitted to a CPU of a data library apparatus that is a host. Also, the data transmitted from the CPU of the data library apparatus that is a host are transmitted to the signal processing circuit 404.

406 is a servo circuit, and controls the optical pickup 402 by a servo signal created in the amplification circuit 403. 408 is a memory, and stores programs and various setting information for controlling the data recording and reproducing device, medium information acquired from the optical disk, and the like. Further, although an example in which the memory 408 was connected to the CPU 407 inside the data recording and reproducing device was shown, the connection point may be any place of inside or outside the data recording and reproducing device. Also, 408 may be a hard disk for example instead of a memory as far as information can be held.

Figure 5:
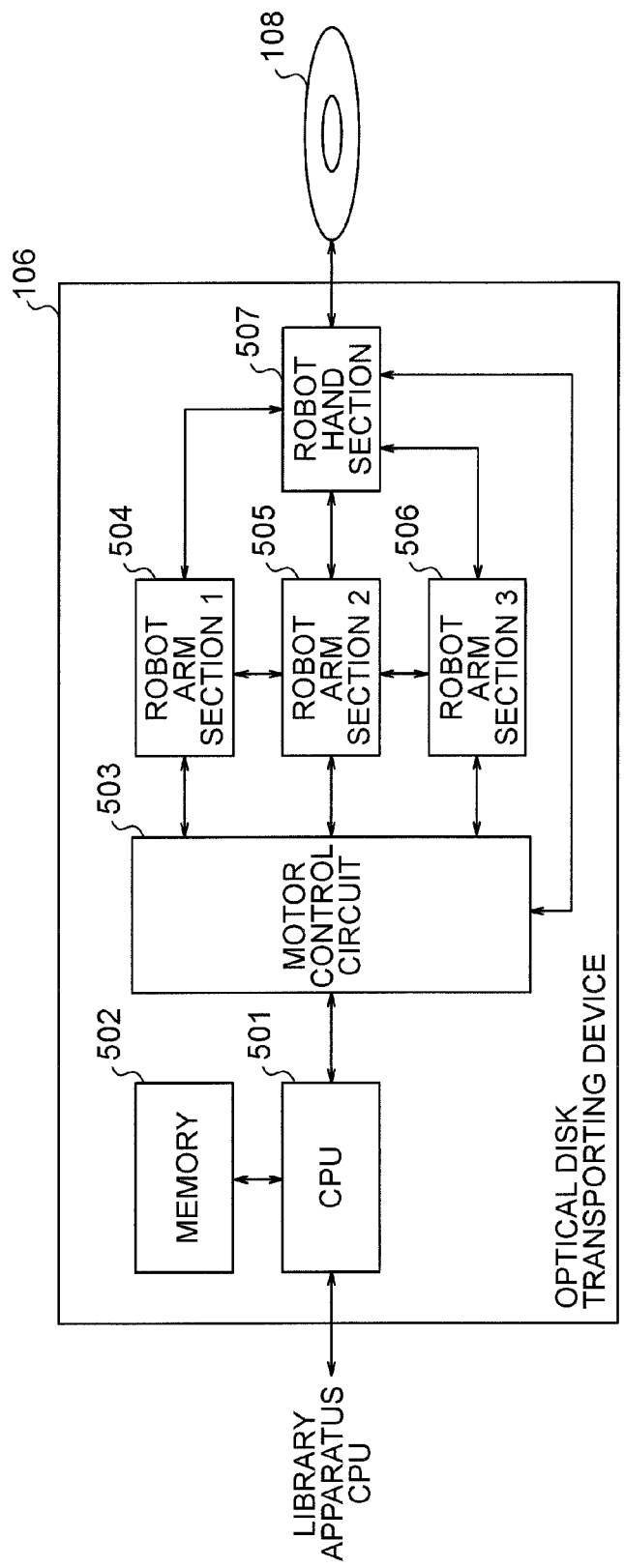
FIG. 5 is a block diagram showing a configuration of an optical disk transporting device.
Figure 6:
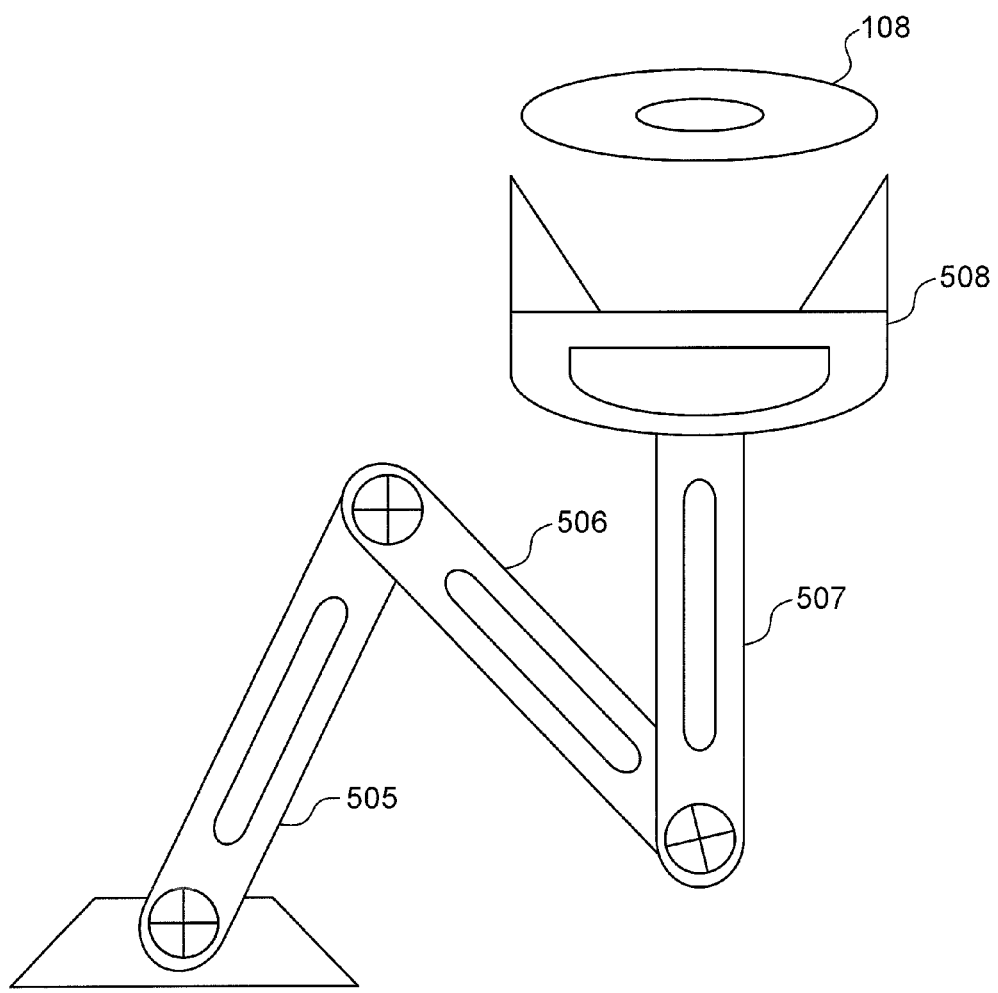
FIG. 6 is an outside drawing of the optical disk transporting device.

FIG. 5 is a block diagram of the optical disk transporting device, and FIG. 6 is an outside drawing of the optical disk transporting device.

501 a CPU, and executes control of the optical disk transporting device. 502 is a memory, and stores programs, various setting information and the like for controlling the optical disk transporting device. Further, the memory 502 is used also as a region for recording thermal information and vibration information collected. Furthermore, although an example in which the memory 502 was connected to the CPU 501 inside the optical disk transporting device was shown, the connection point may be any place inside or outside the optical disk transporting device. Also, 501 may be a hard disk for example instead of a memory as far as information can be held.

503 is a motor control circuit, and drives robot arm sections of 504, 505, 506 based on the instruction from the CPU 501. Also, the motor control circuit 503 drives a robot hand section 507. The robot arm sections of 504, 505, 506 adjust the position of the robot hand section 507 by rectilinear motion such as advancing and retreating and turning motion. The robot hand section 507 has a shape capable of holding the optical disk 108 without damaging it, and executes putting in/out and delivering of the optical disk with respect to the optical disk storage device 107 and the data recording and reproducing devices 109, 110, 111.

By the optical disk transporting device having the configuration described above, the optical disk is transported between the optical disk storage device and the data recording and reproducing devices according to the instruction from the CPU of the data library apparatus.

Also, here, an example is shown in which one set of the optical disk transporting device exists in the data library apparatus, however plural sets of the optical disk transporting device may be present. Further, the shape of the optical disk transporting device is not limited to that of the example of FIG. 6, and, for example, such shape is also possible that the optical disk is fixed utilizing the center hole of the optical disk for transportation, or alternatively, the optical disk is pushed out and taken out from the optical disk storage device, the optical disk taken out is stored in a case for transportation, and the optical disk is transported along with the case.

In the meantime, main use of the data archive system is to record a large amount of data in a recording medium for retention. In recent years, the data volume held by an individual or a business enterprise increases explosively, and the archive system has the needs of recording a large amount of data and retaining the same for a long period of time. In order to cope with the needs of recording a large amount of data, it is required in the data archive system that a recording medium with a large capacity can be handled, largest possible numbers of the recording media can be handled, new recording medium can be easily substituted and utilized when old recording medium is entirely used, and so on. Also, in order to cope with the needs of retaining the data for a long period of time, it is required in the data archive system that a recording medium suitable to retention over a long period of time can be handled, a completely recorded recording medium can be easily detached from the system in order to store the same in an environment suitable to retention, the recording medium can be attached to the system easily to allow reading when reading of the data recorded in the stored recording medium is requested, and so on.

In the present example, description will be made with an example of a data archive system using an optical disk for the recording medium. It is known that the optical disk is suitable to retention over a long period of time and is superior to other medium in terms of data protection at the time of a disaster. Also, plural sheets of the optical disks are to be stored in the optical disk storage device, and the optical disk is to be replaced along with the optical disk storage device.

Figure 7:
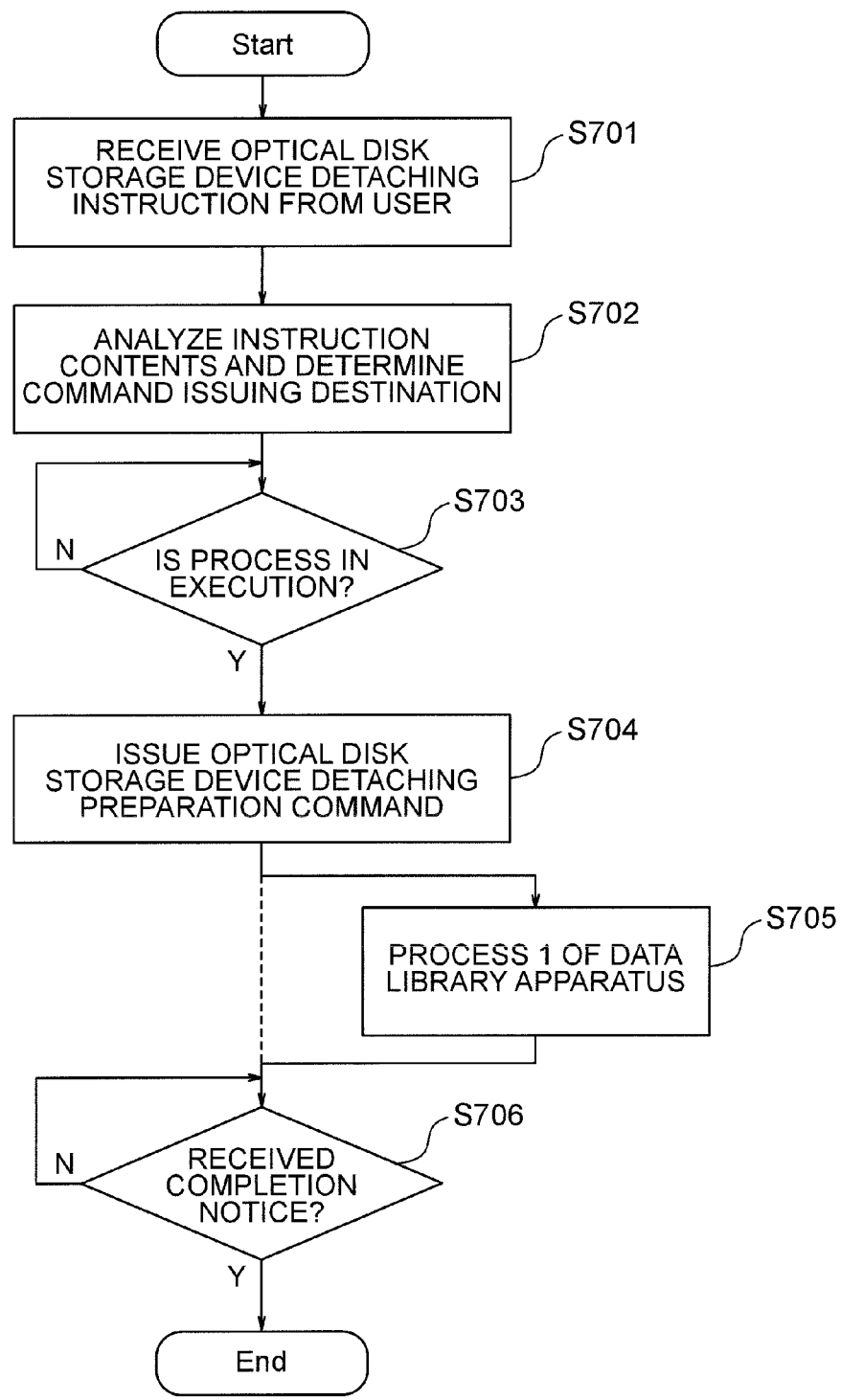
FIG. 7 is a basic process flowchart of a server when an optical disk storage device is detached.

FIG. 7 shows a basic process flow executed by a server when an optical disk storage device is detached from a data library apparatus. In step S701, an optical disk storage device detaching instruction from a user is received. At this time, the user instructs which optical disk storage device of which data library apparatus connected to a server through a user interface unit of a server is to be detached for example. In step S702, the contents of the command received in Step 701 is analyzed, and which command is to be issued to which data library apparatus is determined.

In step S703, whether there is an ongoing process in the data library apparatus of the command issuing destination is confirmed. When the ongoing process is completed, the process proceeds to step S704. Also, this is nothing but an example, and more detailed condition determination may be executed. For example, if two sets of optical disk storage device exist in the data library apparatus, viz, the optical disk storage device A and the optical disk storage device B, it is preferable that, when a command of detaching the optical disk storage device A is received while an optical disk stored in the optical disk storage device A is taken out and data recording is executed by the data recording and reproducing device, the optical disk storage device A can be detached only after confirming completion of the ongoing process. The reason is that, when the optical disk storage device A is detached before completion of the process, the optical disk in which data recording is in execution by the data recording and reproducing device cannot be stored in the original position. On the other hand, it is also preferable that, even if an optical disk is detached from the optical disk storage device A and the process is in execution, when an optical disk has not been detached from another optical disk storage device B, detaching is allowed for the optical disk storage device B. In Step 704, a detaching preparation command of the optical disk storage device is issued to the data library apparatus of the command issuing destination. Step S705 is a process executed when the detaching preparation command of the optical disk storage device is received from the server in the data library apparatus. The detail will be described using FIG. 8.

Figure 8:
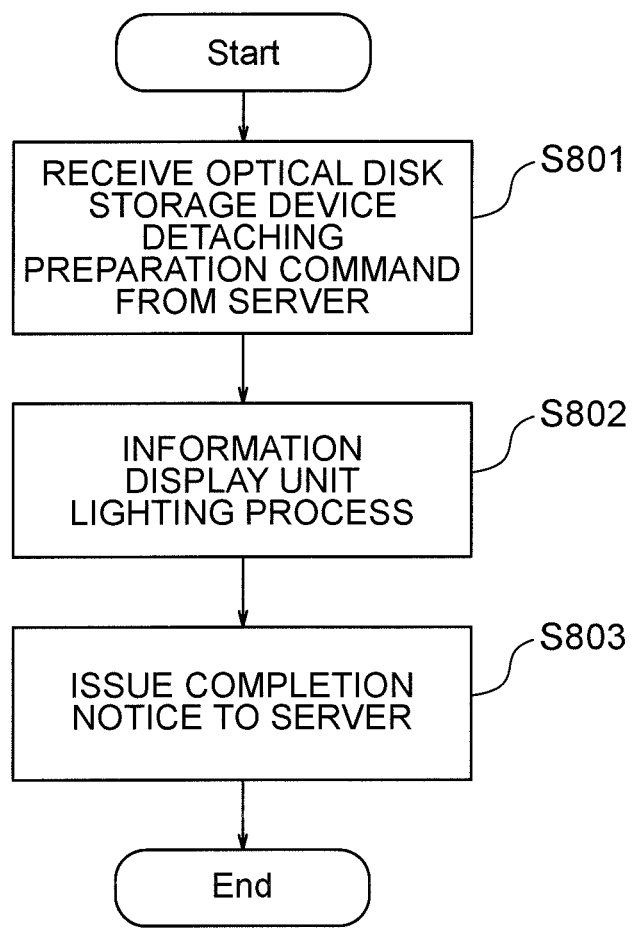
FIG. 8 is an optical disk storage device detachment preparation process flowchart of the data library apparatus.

In step S801 of FIG. 8, an optical disk storage device detaching preparation command from the server is received. In the data library apparatus having received the command, a predetermined process for detaching the optical disk storage device is executed. Also, the command may include, for example, information showing the reason for detaching the optical disk storage device, and, when plural sets of the optical disk storage device are included in the data library apparatus, information instructing which is to be detached. When such information is transferred from the server, the data library apparatus can execute more precise control.

In step S802, control of lighting the information display unit of 104 in a predetermined color and so on is executed. This is for showing which optical disk storage device is to be detached when plural sets of optical disk storage device exist for example. When two sets of optical disk storage device i.e. the optical disk storage device A and the optical disk storage device B exist in the data library apparatus and the server issues a detaching command for the optical disk storage device A, the information display unit corresponding to the optical disk storage device A is changed from lighting in the green color to the lighting state in the orange color and so on, and thereby a state that the optical disk storage device A can be detached is shown. Next, in step S803, the server is notified of an event that a series of processes related to the command received in step S801 has been completed.

Returning to FIG. 7, in step S706, a process completion notice from the data library apparatus is waited for, and, upon receipt of the completion notice, the process is finished. Further, although it is not illustrated here, it is also possible to arrange a step for confirming whether the process has been properly executed or not and to issue the command of step S704 again when the process has not been properly executed, and so on.

Here, it is envisaged that the work for actually detaching the optical disk storage device from the data library apparatus is artificially executed by a worker. More specifically, the event that the information display unit of the data library apparatus is prepared for detaching is shown by step S802, and the worker having seen the display executes the detaching work. It is a matter of course that up to detaching can be automated. In that case, such steps would be executed that a detaching command is issued after step S706, lock of the door of the data library apparatus is released in the data library apparatus, and detaching process for the optical disk storage device is executed.

Further, although an example has been shown here that a user detaches the optical disk storage device through the server, it is also possible that a worker near the data library apparatus requests detaching. In the case, for example, the worker executes an operation for requesting of detaching on the user interface unit 103 of the data library apparatus. More specifically, the worker presses a predetermined button, and so on. In the data library apparatus, upon detection that the button has been pressed, the server is notified of the event that the operation intending to detach the optical disk storage device B for example has been executed, the server confirms whether detaching is to be permitted or not, if yes, confirms that detaching is possible, and thereafter issues an optical disk storage device detaching preparation command (similar to that in step S704) to the data library apparatus and so on to detach the optical disk storage device.

Figure 9:
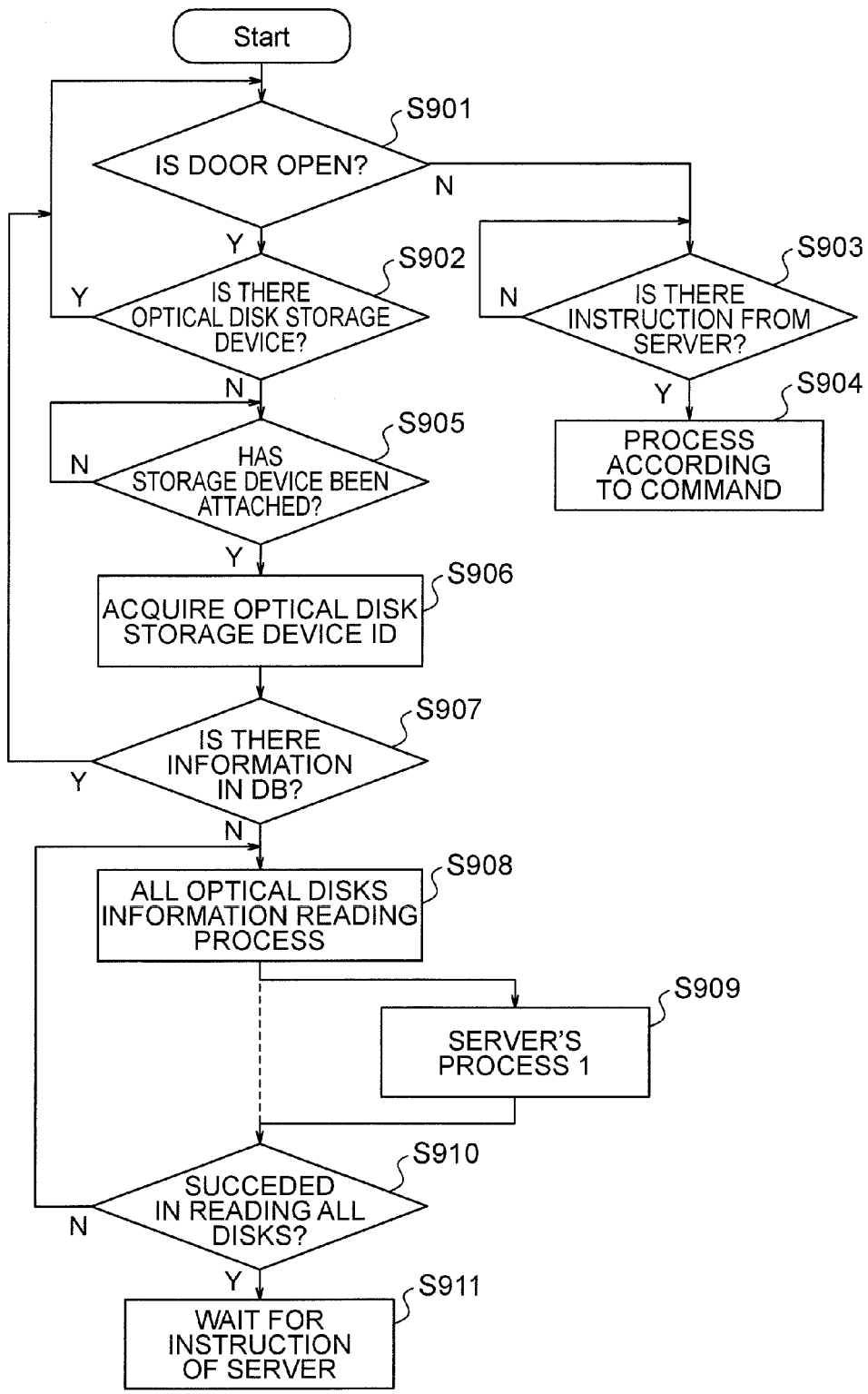
FIG. 9 is a basic process flowchart of the data library apparatus when the optical disk storage device is attached.

FIG. 9 shows a basic process flow executed by the data library apparatus when the optical disk storage device is attached to the data library apparatus. Further, although a case of attaching only one set of optical disk storage device is shown here, it is only an example, and there is also a case of attaching plural sets of optical disk storage device. In step S901, whether the door of the data library apparatus is open or not is confirmed. For the confirmation, the door open/close detecting unit 114 is utilized. In the present example, the data library apparatus is used in a state the door is closed. The state the door is open is a special case, and the occasion the optical disk storage device is detached or attached corresponds to it. The process proceeds to step S902 when the door is open, and proceeds to step S903 when the door is not open. Because step 903 is a normal state that the door is closed as described above, in the data library apparatus, a command from the server is waited for, when the command is received from the server, the process proceeds to step S904, and the process commanded is executed. On the other hand, in step S902, whether the optical disk storage device has been attached or not is confirmed. For the confirmation, the optical disk storage device attaching/detaching detecting unit 113 is utilized. When the optical disk storage device has not been attached, the attaching work is to be executed next, and the process proceeds to step S905. When the optical disk storage device has been attached, the process returns to step S901 assuming that attaching work has already finished and the door is to be closed, or detaching work is to be executed next. In step S905, as a result of the confirmation in step S902, whether or not the optical disk storage device has been attached in a place the optical disk storage device was not attached is confirmed. When the optical disk storage device has been attached, the process proceeds to step S906. In step S906, identifying information for the optical disk storage device is acquired from the storage device included in the optical disk storage device. The identifying information for the optical disk storage device is unique information imparted to each optical disk storage device for identifying the optical disk storage device, and does not overlap with that of other optical disk storage devices.

In FIG. 11, an example of information stored in a storage device included in the optical disk storage device is shown. In the drawing, the address of the storage device and the data stored in each address are shown. As shown in the drawing, in the address 0x00000000 of the storage device, the identifying information of the optical disk storage device consisting of 16 bytes is stored. In step S906, the identifying information of the optical disk storage device is acquired from a predetermined address of the storage device. In step S907, the server is notified of the acquired identifying information, and whether or not the information related to the optical disk storage device attached in step S905 has been registered on the data base is confirmed. When the information has been registered already, the process returns to step S901, if the door is closed, the instruction from the server is received and the process is executed. Further, although it is configured here to continue the process when the optical disk storage device information has been registered on the data base, more precise control can be executed. For example, it is also possible that, as a countermeasure for a case there is a discrepancy between the information registered on the data base and the optical disk storage device attached and the optical disk built in, the process of step S908 is executed even when there is registration on the data base, or alternatively the date when there was writing lastly in each optical disk included in the optical disk storage device is stored in the storage device, said date is compared to the date of the data base, the process proceeds to step S908 when the dates do not agree to each other, the process returns to step S901 when the dates agree to each other, and so on. Also, in the address 0x00000010 of the storage device, a use situation flag of the optical disk storage device is stored. The detail of the use situation flag of the optical disk storage device will be discussed later.

On the other hand, when the optical disk storage device information has not been registered on the data base, the process proceeds to step S908. In step S908, with respect to all optical disks included in the attached optical disk storage device, the process of examining the contents thereof is executed. As an example of the contents of the process, such a series of processes is executed for all optical disks that the optical disk included in the optical disk storage device is taken out by the optical disk transporting device, is transported to the data recording and reproducing device and is stored in the data recording and reproducing device, the data recorded in the optical disk are read by the data recording and reproducing device, the data completely read are stored for example in the memory and the like of the data library apparatus, the optical disk is taken out from the data recording and reproducing device, is transported by the optical disk transporting device and is returned to the original position of the optical disk storage device. In executing the series of processes with respect to all optical disks, when it is assumed that it takes the time of X minutes per one sheet of optical disk and the number of sheets of the optical disks stored in the optical disk storage device is Y sheets, total processing time turns out to be Y times of X. Also, the time X per one sheet varies according to the kind of the optical disk and the volume and the number of the data recorded in the optical disk, and it is also conceivable that, in an optical disk with much data volume for example, it takes many times of the period of time compared to an optical disk with less data volume. In other words, the processing time of step S908 is considerably long, which is a problem as a system.

Figure 10:
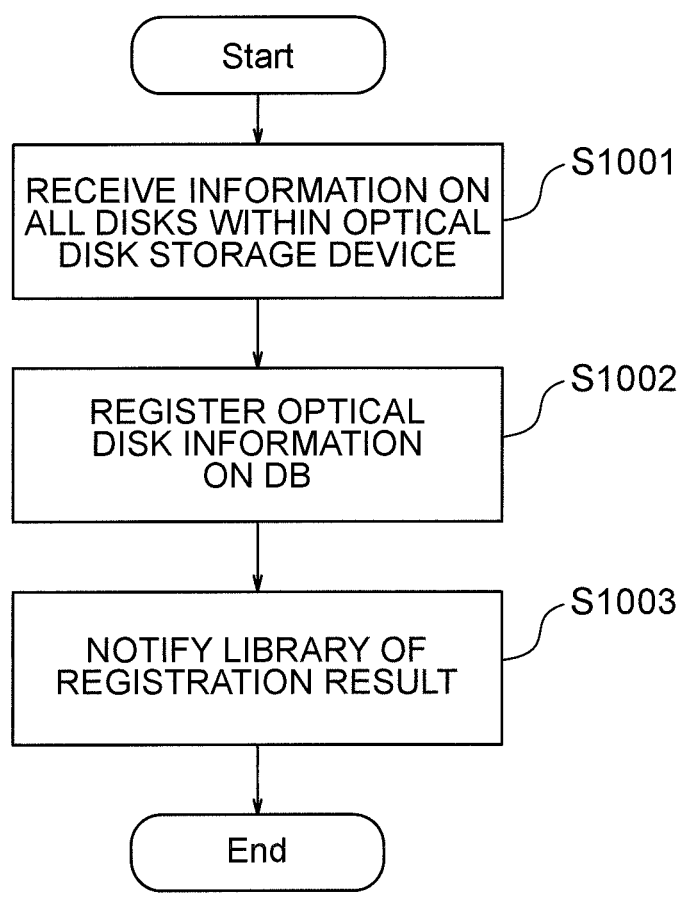
FIG. 10 is a data base registration process flowchart for all optical information in the server.

Step S909 is a process on the server side. Description will be made using FIG. 10. In step S1001, information of all optical disks read by the data library apparatus is received. In step S1002, the optical information received is registered on the data base. Also, for simplifying the drawing, it is configured that all optical disk information is received in one step in step S1001 and all optical disk information is registered on the data base collectively in step S1002, however, it is nothing but an example. For example, it is also possible to execute the process of receiving information of every sheet of the optical disk and registering the information of every sheet on the data base repeatedly by the number of sheets of the optical disks. In step S1003, the data library apparatus is notified of the result whether or not the information received could be correctly registered on the data base. Returning to FIG. 9, in step S910, receiving the data base registration result from the server, the event reading of all disk information has been completed is confirmed. The process proceeds to step S908 when reading has not been completed, and the process proceeds to step S911 and instruction from the server is waited for when reading has been completed. Also, it is preferable to execute an error processing appropriately in step S910. For example, with respect to the optical disk in which the information could not be read well, reading of the information is tried again, or reading by a data recording and reproducing device different from the data recording and reproducing device in which reading out of the information was failed is tried, and so on.

FIG. 12 shows an example of information read in step S906 and step S908 and registered on the data base in step S1002. The drawing is an example of gathering information of the optical disk storage device itself and information related to the optical disk built in the optical disk storage device together. First, as the information of the optical disk storage device itself, the identification number of the optical disk storage device is registered. Also, as the information common to the optical disks stored in the optical disk storage device, information of the kind of the optical disk, the number of the layer if it is a multi-layered optical disk and the number of sheet of the optical disks stored in the optical disk storage device are registered. That shown here is an example 500 sheets of the optical disk are stored, and individual information is registered with respect to 500 sheets of the optical disk. More specifically, with respect to each optical disk having the optical disk management No. 1 to 500, the number of files recorded in the disk, the kind of the data, file path, file size, time stamp of each file and the like are registered. Further, although it is not illustrated, if the identification number of the optical disk is registered in order to identify an optical disk, more precise and surer control becomes possible. Such information is registered on the data base, and this information is referred to and updated in various situations of controlling the data archive system such that, for example, when a user requests reading of the data, from which optical disk of which optical disk storage device attached to which data library apparatus the data is favorably read out is determined, or when a user requests writing of the data, to which optical disk of which optical disk storage device attached to which data library apparatus the data are favorably written is determined, and the data base is updated upon completion of writing.

Figure 13:
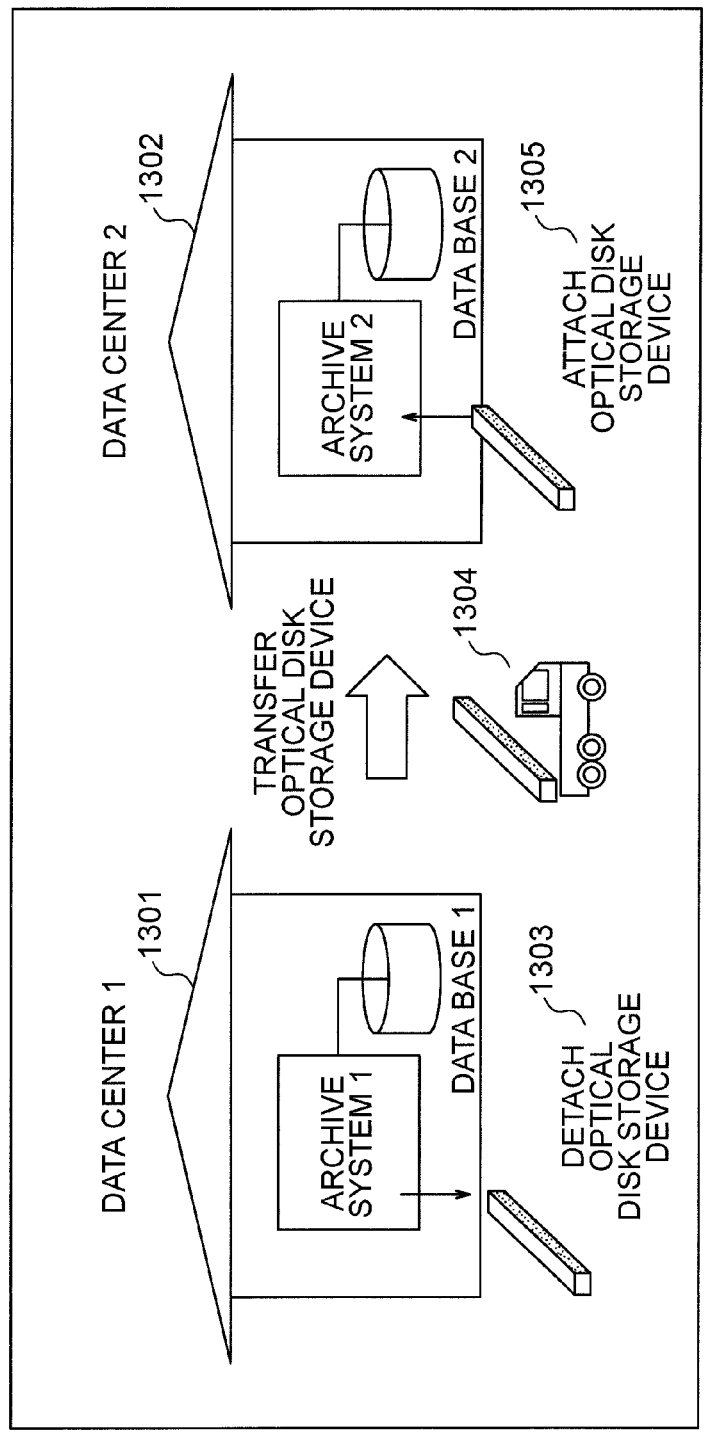
FIG. 13 is a drawing showing an example of moving an optical disk storage device to another data center.

It is presumed that handling of the optical disk storage device and the optical disk built in differs according to the user or the use. For example, there is a case the optical disk storage device is left to be attached to the data library apparatus at all times, or there is also a case detaching and attaching are repeated frequently. Moreover, there is also a case the optical disk storage device is detached from the data library apparatus A where the data was recorded, and is attached to another data library apparatus B. Furthermore, various examples are possible such that, when an optical disk storage device is moved or exchanged between the data library apparatus A and the data library apparatus B, for example, there is a case the optical disk storage device is installed in a same data center and the data base is shared, or as shown in FIG. 13, the optical disk storage device is moved to another data center and is attached to a system having different data base, and so on. In the example of FIG. 13, the optical disk storage device is moved from a data center 1 of 1301 to a data center 2 of 1302. The optical disk storage device is detached in 1303, the optical disk storage device is transferred from the data center 1 to the data center 2 in 1304, and the optical disk storage device is attached in 1305.

Here, it is a problem that, when the optical disk storage device is to be attached or detached, unless the process of examining the contents is executed for all optical disks included in the optical disk storage device with respect to the optical disk storage device attached to the data library apparatus shown in step S908, the optical disk storage device and the optical disk cannot be controlled properly, and enormous time is required for the process.

Therefore, a means will be described which is for saving the process of examining the contents of all optical disks included in a optical storage device when the optical disk storage device is detached or attached, and properly controlling the optical disk storage device and the optical disk. The present means is effective particularly in a case the optical disk storage device is not left to be attached to a same data library apparatus at all times but is frequently attached and detached, and a case the optical disk storage device is detached and attached between data archive systems disposed in different data centers and do not share the data base.

Figure 14:
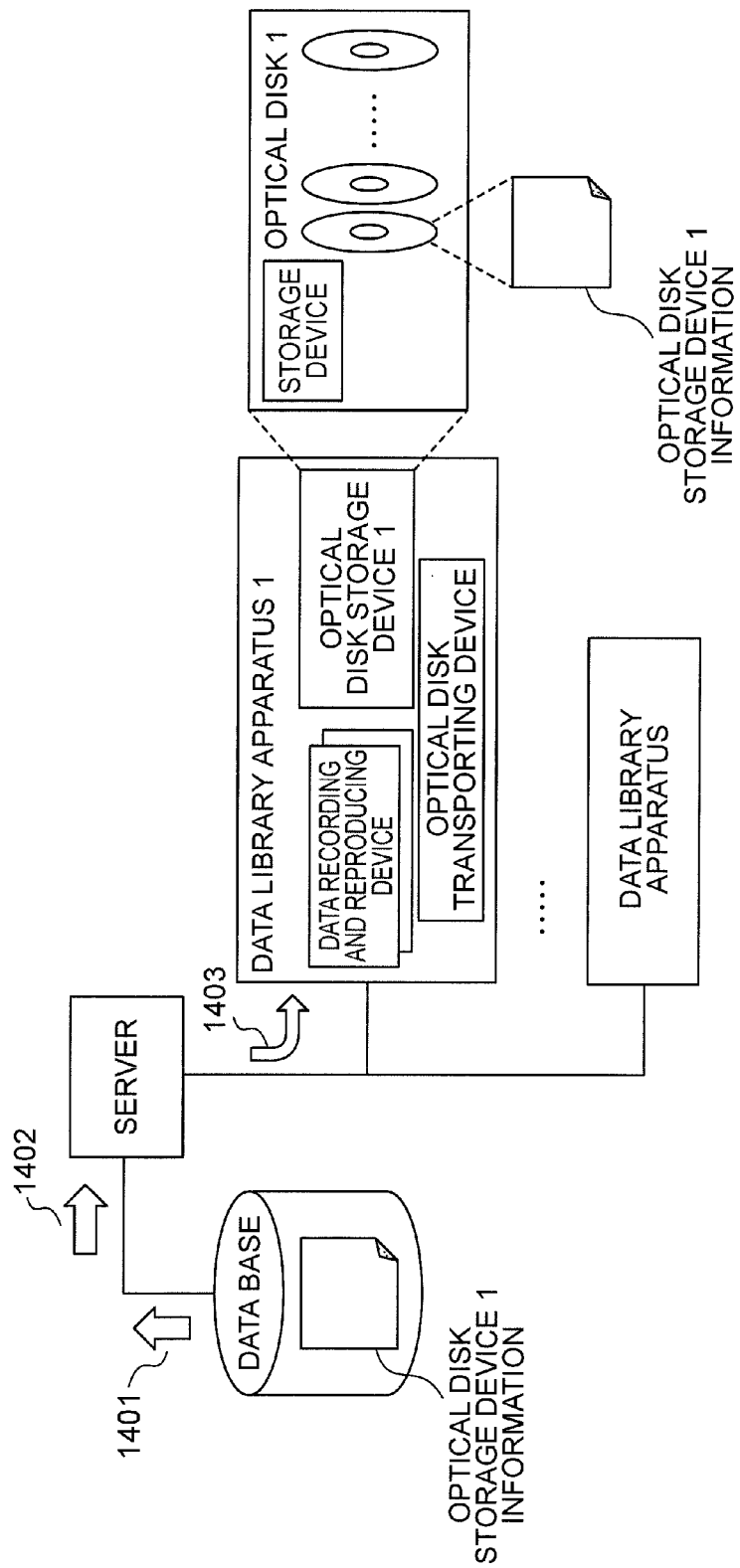
FIG. 14 is a drawing showing an example of an action in detaching an optical disk storage device from a data library apparatus.

FIG. 14 shows an example of an action in detaching an optical disk storage device from a data library apparatus in the data archive system of the present application. To the server, the data base and plural sets of data library apparatus are connected. On the data base, information required for controlling the system such is to be registered which is information of each data library apparatus, information of the optical disk storage device attached to each data library apparatus, information of the optical disk included in each optical disk storage device, and the like. The drawing shows an example in detaching an optical disk storage device 1 from a data library apparatus 1. In detaching the optical disk storage device 1 from the data library apparatus 1, the server reads information related to the optical disk storage device 1 from the data base in 1401, and acquires the same in 1402. Next, in 1403, the acquired information related to the optical disk storage device 1 is delivered to the data library apparatus 1 to which the optical disk storage device 1 is attached. The data library apparatus 1 records the information related to the optical disk storage device 1 in the optical disk 1 included in the optical disk storage device 1 by the data recording and reproducing device. Here, when the data size is large compared to the capacity of the optical disk, the data is recorded dividedly into plural optical disks without limiting to the optical disk 1. Thus, in detaching an optical disk storage device from a data library apparatus, it is controlled so that detaching is possible only after information registered on the data base and related to the optical disk storage device to be detached is recorded in the optical disk included in the optical disk storage device to be detached.

Figure 15:
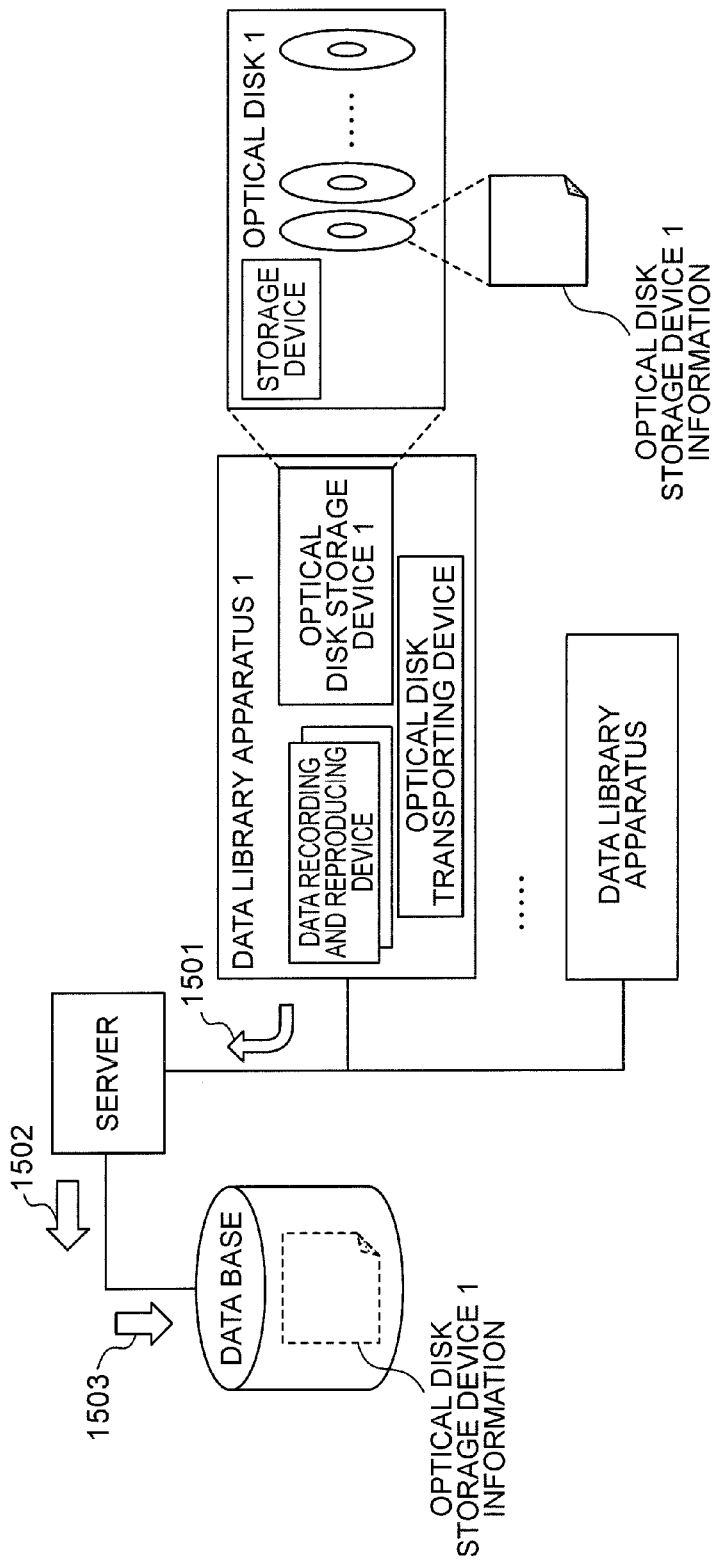
FIG. 15 is a drawing showing an example of an action in attaching an optical disk storage device to a data library apparatus.

FIG. 15 shows an example of an action in attaching an optical disk storage device to a data library apparatus in the data archive system of the present application. As shown in FIG. 15, when the optical disk storage device 1 is attached to the data library apparatus 1, the data library apparatus 1 reads information related to the optical disk storage device 1 from the optical disk 1 included in the optical disk storage device 1, and transmits the read information to the server in 1501. Upon receipt of the information related to the optical disk storage device 1 transmitted from the data library apparatus 1, the server delivers the information related to the optical disk storage device 1 having been received to the data base in 1502, and registers the same on the data base in 1503. When the information related to the optical disk storage device 1 has been registered dividedly on plural optical disks, the information is read from the plural optical disks. Thus, in attaching an optical disk storage device to a data library apparatus, it is controlled so that information related to the optical disk storage device to be attached having been recorded on the optical disk included in the optical disk storage device to be attached is read and registered on the data base. For example, in FIG. 14, when the optical disk storage device 1 is detached from the data library apparatus 1 and information of the data base is eliminated thereafter due to some reason, if the optical disk storage device 1 having been detached is attached again to the data library apparatus 1, information of the optical disk storage device 1 registered on the optical disk included in the optical disk storage device 1 is read out and is registered on the data base, therefore the information related to the optical disk storage device attached is registered on the data base without examining the contents of all optical disks included in the optical disk storage device 1, and the data library apparatus, the optical disk storage device included in the data library apparatus, and all optical disks included in the optical disk storage device can be controlled based on the information registered on the data base.

Also, for example, in FIG. 14, when the optical disk storage device 1 is detached from the data library apparatus 1 and is attached to a data archive system (to be referred to as the data archive system 2) disposed in a data center different from the data archive system (to be referred to as the data archive system 1) of FIG. 14, information related to the optical disk storage device 1 having been detached from the data library apparatus 1 of the data archive system 1 has not been registered on the data base of the data archive system 2, however, as shown in FIG. 15, when the optical disk storage device 1 is attached to the data library apparatus of the data archive system 2, the information of the optical disk storage device 1 having been registered on the optical disk included in the optical disk storage device 1 is read and registered on the data base, therefore, in the data archive system 2, the information related to the optical disk storage device attached is registered on the data base without examining the contents of all optical disks included in the optical disk storage device 1, and the data library apparatus, the optical disk storage device included in the data library apparatus, and all optical disks included in the optical disk storage device can be controlled based on the information registered on the data base.

Figure 16:
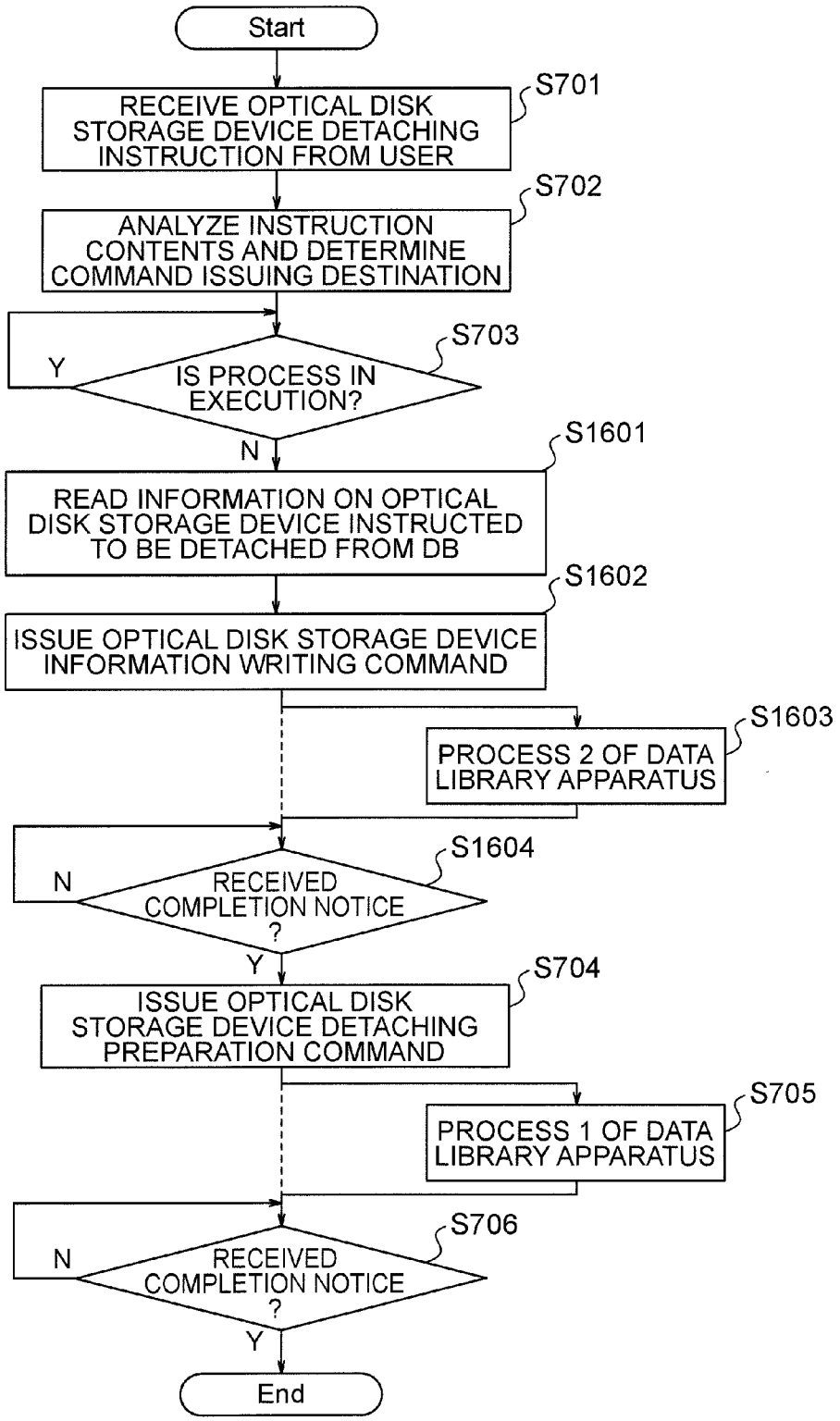
FIG. 16 is a process flowchart in writing information related to an optical disk storage device in an optical disk.

FIG. 16 shows an example of a flowchart of process for recording information related to an optical disk storage device on an optical disk included in the optical disk storage device when the optical disk storage device is detached from a data library apparatus. Also, detailed description related to steps overlapping with those of FIG. 7 described above will be omitted in the drawing.

In step S701, the server receives the optical disk storage device detaching instruction transmitted from the user. In step S702, the contents of the command received in step S701 are analyzed, and what command is to be issued to which data library apparatus is determined. In step S703, whether there is a process in execution in the data library apparatus of the command issuing destination is confirmed, and if there is no process in execution, the process proceeds to step S1601. Also, when a process not related to the optical disk storage device having been instructed to be detached has been executed, it is also possible to proceed to step S1601 even when the process is in execution. In step S1601, information related to the optical disk storage device having been instructed to be detached in step S701 is read from the data base. Although various information has been registered other than the information on the data base, when information concerned is retrieved from the identification number of the optical disk storage device for example, required information can be retrieved efficiently. In step S1602, a command is issued to the data library apparatus so that the optical disk storage device information read in step S1601 is written in the optical disk. More specifically, a command is issued to the data library apparatus to which the optical disk storage device having been instructed to be detached in step S701 is attached to write the information of the optical disk storage device having been instructed to be detached in any one or plural optical disks out of the optical disks included in the optical disk storage device having been instructed to be detached using any one of the data recording and reproducing device included in the data library apparatus. In step S1603, the data library apparatus executes a process in accordance with the command of step S1602. Description will be made using FIG. 17.

In step S1701, a command for writing the optical disk storage device information in the optical disk issued by the server is received. In the command, it is to be shown that up to the extent that in which optical disk the information is written using which data recording and reproducing device within the data library apparatus. In step S1702, the preparation process is executed with respect to the data recording and reproducing device specified in the command of step S1701. The preparation process of the data recording and reproducing device means for example to make a device in a sleep state into a workable state, or to issue a test command and to confirm whether the device properly works. In step S1703, the optical disk for data writing specified in the command of step S1701 is taken out from the optical disk storage device by the optical disk transporting device. In step S1704, the optical disk taken out in step 1703 is transported to the data recording and reproducing device prepared in step S1702. In step S1705, the optical disk is mounted on the data recording and reproducing device. In step S1706, the optical disk storage device information is received from the server, and is written in the optical disk sequentially. In step S1707, whether writing has been completed or not is confirmed, if yes, the process proceeds to S1708, and if no, the process returns to step S1706. Further, although it is shown that the process of writing the optical disk storage device information in the optical disk is to be achieved in one step (step S1706), for example, it is possible to receive the optical disk storage device information from the server at one time and write the same in the optical disk, and it is also possible to receive the optical disk storage device information from the server dividedly into plural times, and, when writing of the received information has been completed, to receive next information and to write the same. When the information volume of the optical disk storage device information is much, it is preferable to receive the information dividedly and to write the same. In step S1708, the optical disk having completed to record the optical disk storage device information is taken out from the data recording and reproducing device. In step S1709, the optical disk is transported by the optical disk transporting device. In step S1710, the optical disk is stored in the optical disk storage device. At this time, the optical disk is stored in a location same to that in being taken out in step S1703 (original location). In step S1711, the server is notified of the event a series of processes of FIG. 17 has been completed, and the process is completed.

Returning to the description of FIG. 16, in step S1604, whether the data writing completion notice has arrived from the data library apparatus is confirmed, if yes, the process proceeds to step S1604, and if no, the process waits until arrival of the notice. Further, although it is not illustrated, it is convenient, for example, when the notice does not arrive from the data library apparatus even when a constant or more time has elapsed, user is notified of the error, or the process restarts from step S1602 for retrial. In step S704, the detaching preparation command for the optical disk storage device is issued to the data library apparatus of the command issuing destination. In step S705, the detaching preparation command is executed in the data library apparatus having received the detaching preparation command with respect to the optical disk storage device from the server. In step S706, the process completion notice from the data library apparatus is waited for, and, upon arrival of the completion notice, the process is completed. Here, only after completion of the processes of steps S704-706, the optical disk storage device becomes in a state capable of being detached from the data library apparatus. More specifically, by executing the processes of steps S704-706 after recording the optical disk storage device information, information of the optical disk storage device comes to be recorded on the optical disk without fail when the optical disk storage device is detached.

By such process flow, in detaching an optical disk storage device from a data library apparatus, information related to the optical disk storage device is recorded on the optical disk included in the optical disk storage device.

Further, in the flowchart of FIG. 16, the process applied when the optical disk storage device detaching instruction was received from the user was described, however, this is only an example, and the process is applicable to all situations of detaching the optical disk storage device. For example, it can be applied also to a case the optical disk storage device is detached by the optical disk storage device detaching request from a worker near the data library apparatus.

Moreover, although description was made that the optical disk storage device information is written in one sheet of optical disk, for example, it is preferable to record the same on plural sheets of optical disk when the information volume of the optical disk storage device information is much and cannot be recorded in one sheet of optical disk. At this time, the process similar to the operation with respect to the optical disk of the first sheet shown in FIG. 17 comes to be executed with respect to the optical disk of the second sheet such that, when recording has been completed for the optical disk of the first sheet, the optical disk is stored in the original location of the optical disk storage device, the optical disk of the second sheet is taken out and transported, and so on.

Alternatively, in an optical disk recordable on both sides, when the optical disk storage device information cannot be entirely recorded on one side, it may be recorded on other recording surface of the optical disk.

Or alternatively, instead of one sheet of optical disk, the optical disk storage device information may be recorded in a storage device included in the optical disk storage device. When the storage device included in the optical disk storage device is a flash memory and the like, because information can be written and read at a higher speed compared to an optical disk for example, it is advantageous compared to recording in an optical disk. Therefore, it is also possible for example that a storage device included in an optical disk storage device is given top priority as a recording destination of the optical disk storage device information, and only when the information cannot be entirely recorded in the storage device included in the optical disk storage device, the information that cannot be recorded is recorded in an optical disk. It is a matter of course that, in this case, information showing that the optical disk storage device information has been recorded dividedly in the storage device and the optical disk included in the optical disk storage device becomes necessary. It is preferable that this information is stored for example in a storage device included in an optical disk storage device as shown in FIG. 18 discussed later. Also, when an optical disk storage device is provided with only one set of storage device, both of the management information and the optical disk storage device information as shown in FIG. 11 and FIG. 18 can be stored in the storage device, and when plural sets of storage device are provided, the management information and the optical disk storage device information as shown in FIG. 11 and FIG. 18 can be stored in separate storage devices.

Further, although in which optical disk the optical disk storage device information is to be recorded is to be determined by an instruction from the server, several plans are possible as the determination algorithm thereof. For example, an optical disk in which data have not been recorded yet out of optical disks stored in an optical disk storage device may be selected at random, or alternatively, an optical disk having the least management number out of optical disks in which data have not been recorded yet may be selected. Furthermore, it is also possible that an optical disk in which the optical disk storage device information is to be preferentially recorded or an optical disk exclusive for recording the optical disk storage device information is predetermined, the optical disk is not to be used in normal data recording, and the optical disk is selected in recording the optical disk storage device information.

In the meantime, it is necessary that a third party also can know in which optical disk the optical disk storage device information has been recorded. The reason the optical disk storage device information is recorded in an optical disk is to avoid to examine the contents of all optical disks included in the optical disk storage device, and there is no meaning if it is not known in which optical disk desired information has been recorded in reading the information, and as a result, the contents of each optical disk is examined. As the countermeasures therefor, several plans are possible. For example, in the data archive system of the present application, an optical disk stored at No. 1 of the optical storage device is handled separately from other optical disks, and it is determined beforehand that, in recording the optical disk storage device information, the optical disk storage device information is recorded preferentially in the optical disk of No. 1, or is recorded in the optical disk of No. 1 without fail. In executing control in accordance therewith, the optical disk of No. 1 is written in writing and the optical disk of No. 1 is read in reading, and no concurrence does not occur between writing and reading. Although controlling according to a predetermined rule thus is the simplest countermeasure, when an optical disk in which data have not been recorded at all is to be selected at random for recording, it is preferable to employ another plan. For example, it is preferable to store information showing in which optical disk included in an optical disk storage device information of the optical disk storage device is recorded in a storage device included in the optical disk storage device. FIG. 18 shows an example of information stored in a storage device included in an optical disk storage device. In the example of FIG. 18, the number of sheets (the portion surrounded by a circle in the drawing) of optical disks that record the optical disk storage device information is stored at 0x00000011 of the storage device, and the number (the portion surrounded by a square in the drawing) of optical disks that record the optical disk storage device information is stored at the address of 0x00000012-13 of the storage device. In the example of the drawing, it is shown that the optical disk storage device information is recorded in two sheets of optical disk, and the number of the optical disks that have been recorded are the disk Nos. 1 and 2. Thus, when the information is recorded in a storage device of an optical disk storage device, where the information is recorded can be easily known, and, when the storage device is a flash memory and the like, reading at a very higher speed compared to an optical disk and the like for example is possible. Further, in controlling according to the predetermined rule described above also, in order to make the control surer, the information may be stored in a storage device included in the optical disk storage device. For example, such information may be stored that the number of sheets of the optical disks that record the optical disk storage device information is one sheet, and that the optical disk No. in which the optical disk storage device information has been recorded is No. 1. It is a matter of course that information stored in a storage device may be stored in an optical disk.

Figure 17:
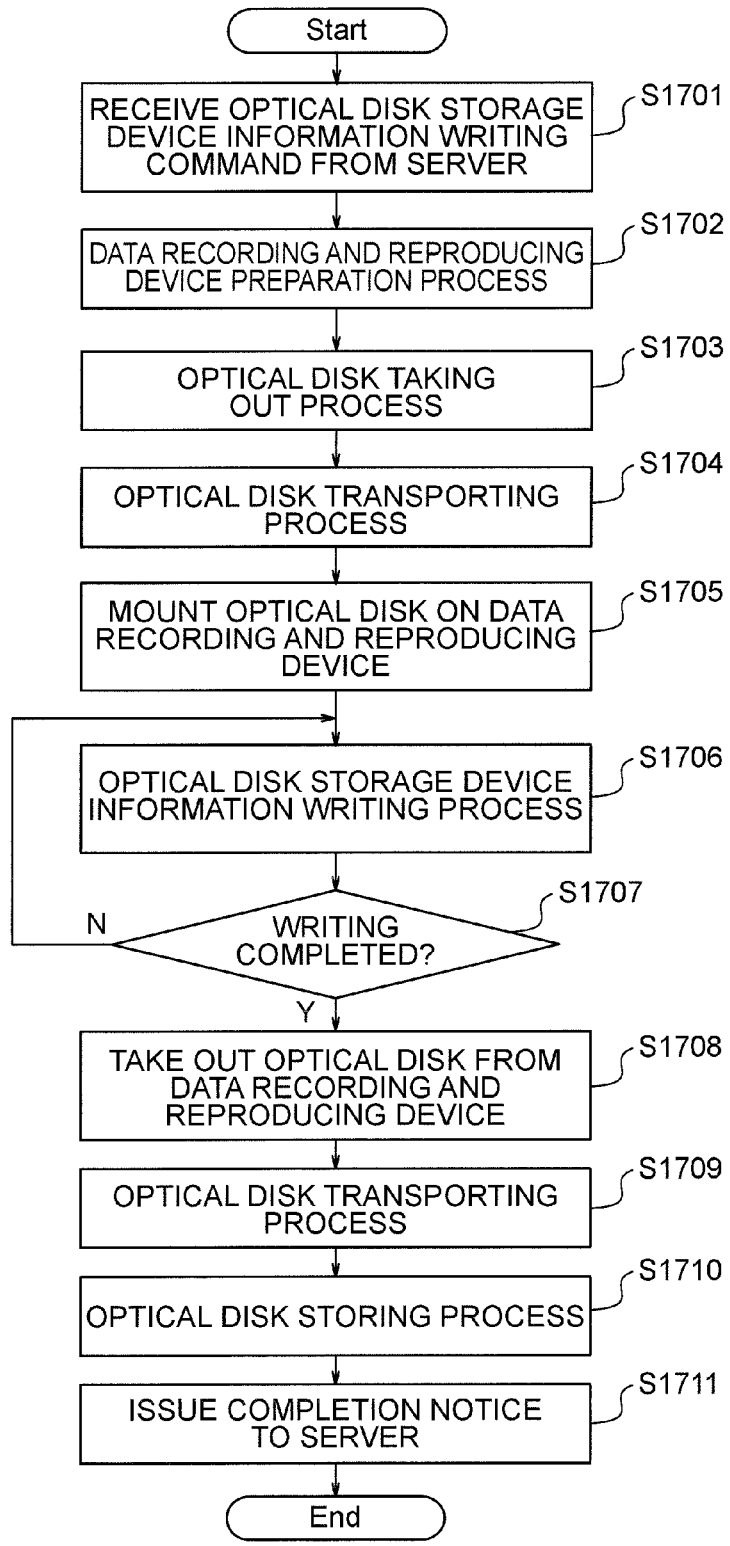
FIG. 17 is a process flowchart of a data library apparatus in writing information related to an optical disk storage device.

Also, such information as shown in FIG. 18 can be written in the storage device after step S1701 of FIG. 17 for example. Further, in order to confirm that the information has been surely stored, information stored in the storage device may be read after step S1604 of FIG. 16 for example to confirm the correctness. Furthermore, the momentum for writing the optical disk storage device information in an optical disk is not limited to the time of detaching the optical disk storage device, and the optical disk storage device information may be written in the optical disk regardless of whether the optical disk storage device is detached or not. For example, it is also possible to write, at one predetermined time of a day, the optical disk storage device information on the data base that is latest at the time point in a predetermined optical disk. Alternatively, it is also possible to write the optical disk storage device information in the optical disk when the data have been recorded to the fullest recordable capacity in all optical disks (exclusive of the optical disk for recording the optical disk storage device information) included in the optical disk storage device. Further, it is also possible to divide the process according to the operating condition of the data library apparatus, and to write the optical disk storage device information in the optical disk when, for example, the data have been recorded to the fullest in all optical disks and the data library apparatus is not operated busily. However, even when the optical disk storage device information is written in an optical disk, if the data are thereafter additionally written again in the optical disk included in the optical disk storage device and the situations arise that the optical disk storage device information should be updated, the updated optical disk storage device information must be written in the optical disk again. In other words, to write the optical disk storage device information in the optical disk frequently becomes a disadvantage and leads to deterioration of the optical disk by repeated writing for example, and therefore it is preferable to minimize writing. For example, it is convenient that the basic rule is to write when the optical disk storage device is detached and the rule can be changed according to the preference of the user in writing by other momentum, and so on.

Also, even if the optical disk storage device information is written in the optical disk, it is preferable to leave the optical disk storage device information on the data base without being deleted. If same information is shared between a data base and an optical disk, even when the information stored in either one thereof may be lost by an accident or a disaster for example, the information can be restored. Further, it is also one of the reasons that, because the capacity for storing a data base is sufficiently large in general, even when same information is written in an optical disk, it is not necessary to delete the same information from the data base immediately. It is a matter of course that, when the system has not enough capacity, information may be deleted immediately from the data base after completion of writing in the optical disk. Alternatively, it is also possible that, even when information is left in the data base after completion of writing in the optical disk, the optical disk storage device information already written in the optical disk is preferentially deleted when the capacity becomes of shortage thereafter, or the information is deleted when a constant period of time has elapsed after writing in the optical disk. Or alternatively, it is also possible to delete the optical disk storage device information after confirming that same optical disk storage device information has been registered on another data base. For example, it is also possible that, when information related to the optical disk storage device 1 registered on the data base 1 in the data center 1 is written in an optical disk included in the optical disk storage device 1, the optical disk storage device 1 is detached and attached to the data library apparatus of the data center 2, and information related to the optical disk storage device 1 is read from the optical disk and is registered on the data base 2, the server 1 of the data center 1 is notified of the event from the server 2 of the data center 2, and the information related to the optical disk storage device 1 is deleted from the data base 1 in the server 1.

In the meantime, to write optical disk storage device information in an optical disk means that the contents of the optical disk included in the optical disk storage device change. Information written in an optical disk is information showing the contents of an optical disk storage device before the information is written, and is not information showing the contents of the optical disk storage device after the information is written. In other words, the fact that information of an optical disk storage device has been written in an optical disk 1 included in the optical disk storage device cannot be held by the optical disk 1. As the countermeasures therefor, several plans are possible. For example, it should be said to be one countermeasure also to write the optical disk storage device information in a predetermined optical disk, and to make information related to the optical disk that the disk is for writing the optical disk storage device information therein, and etc. on the optical disk storage device information. Alternatively, it is also possible to rewrite information related to an optical disk that becomes a writing destination before writing optical disk storage device information in the optical disk, and to write the optical disk storage device information including the rewritten result in the optical disk. Or alternatively, it is also possible to read information as shown in FIG. 18 from the storage device of the optical disk storage device in reading the optical disk storage device information and to register the same on the data base. For example, it is preferable that the event that the optical disk storage device information is written in the optical disks Nos. 1 and 2 is read from the storage device of the optical disk storage device and is registered on the data base.

Figure 19A:
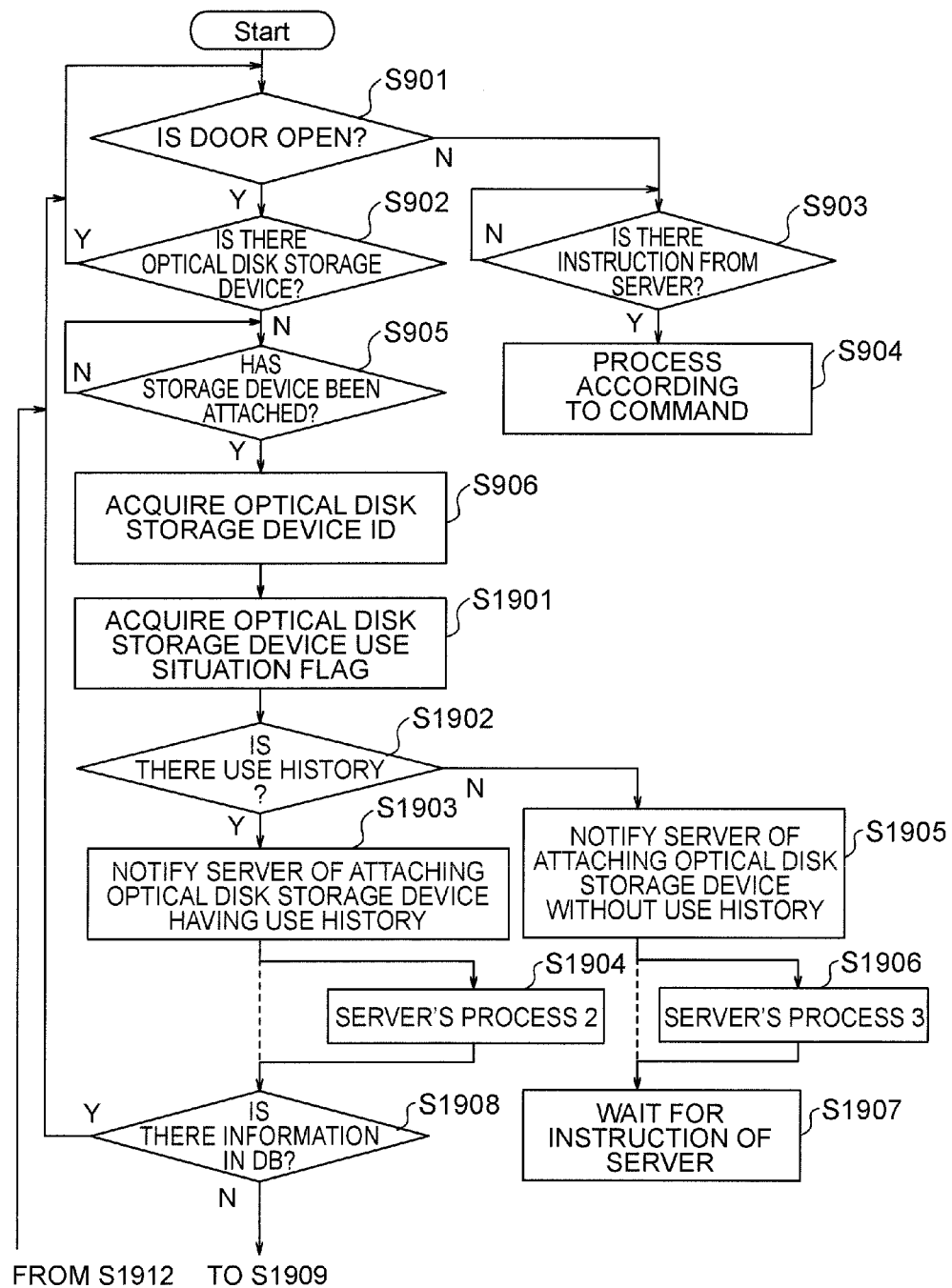
FIGS. 19A and 19B are a process flowchart in reading information related to an optical disk storage device stored in an optical disk.
Figure 19B:
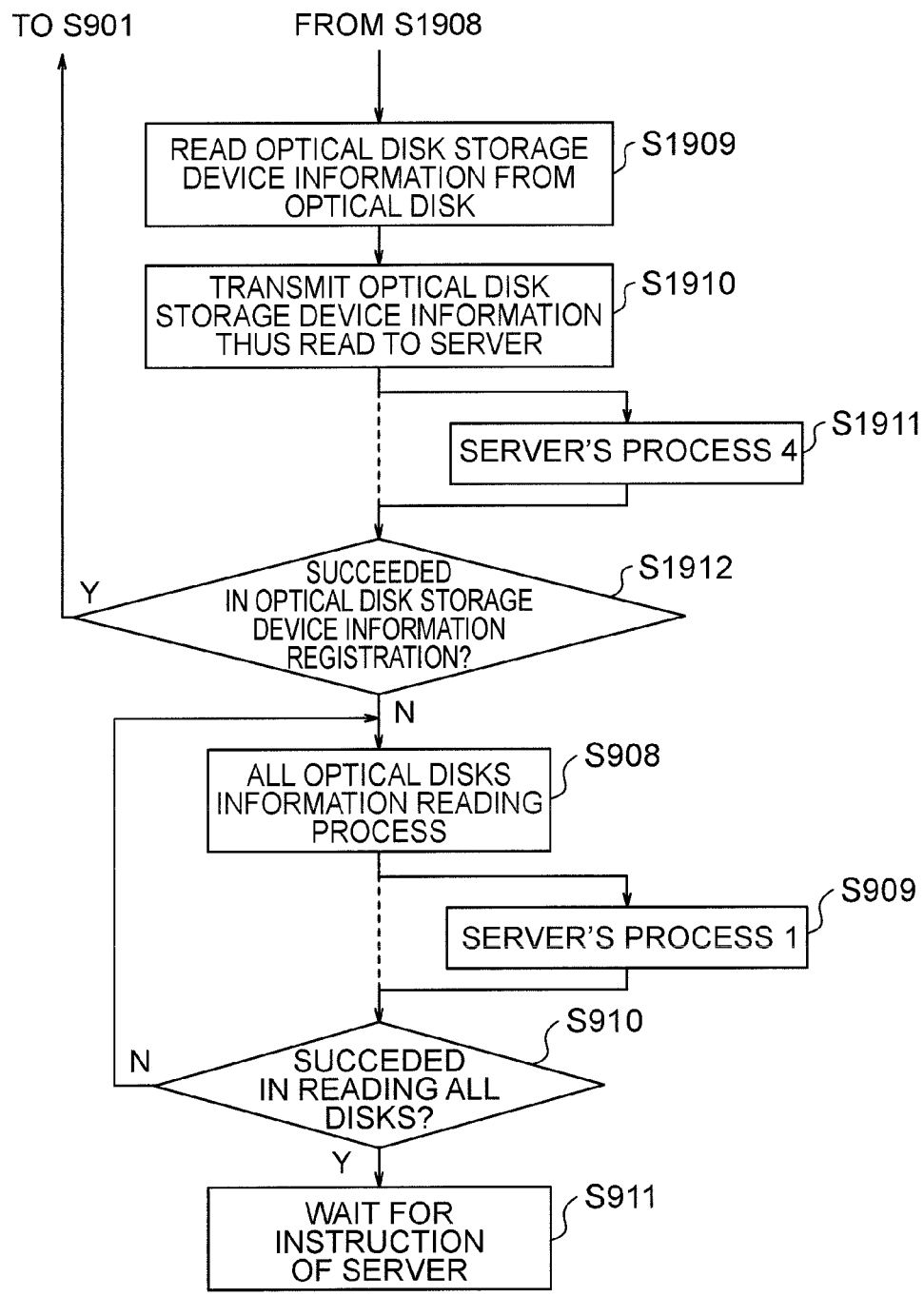

FIGS. 19A and 19B show an example of a flowchart of a process for reading out information related to an optical disk storage device recorded in an optical disk included in the optical disk storage device in attaching the optical disk storage device to a data library apparatus. Also, detailed description related to steps overlapping with those of FIG. 9 described above will be omitted in the drawing.

First, in step S901, whether the door of the data library apparatus is open or not is confirmed. When the door is open, the process proceeds to step S902, and when the door is not open, the process proceeds to step S903. In step S903, the data library apparatus waits for a command from the server, and upon receipt of the command, the process proceeds to step S904, and the commanded process is executed. On the other hand, in step S902, whether the optical disk storage device has been attached or not is confirmed. When the optical disk storage device has not been attached, the process proceeds to step S905. When the optical disk storage device has been attached, the process returns to step S901. In step S905, whether the optical disk storage device has been attached or not in a location the optical disk storage device has not been attached is confirmed, and if yes, the process proceeds to step S906. In step S906, identifying information for an optical disk storage device is acquired from a storage device included in the optical disk storage device. In step 1901, a use situation flag of an optical disk storage device is acquired from a storage device included in the optical disk storage device. The use situation flag of the optical disk storage device is stored in the storage device as FIG. 11 for example. The use situation flag of the optical disk storage device is to be made information of 1 bit for example, is to store 0 when there is no use history that shows presence/absence of usage in the past, and is to store 1 when there is a use history. The example of FIG.

11 shows that the optical disk storage device to which the storage device is attached has a use history. Although plural sheets of optical disk are stored in the optical disk storage device, only unrecorded optical disks are normally stored there. At this time, in the storage device included in the optical disk storage device, 0 (without use history) is stored as the use situation flag for the optical disk storage device. In other words, an optical disk storage device not yet used in all library apparatuses is identified "without use history". Also, when this optical disk storage device is attached to the data library apparatus and data is recorded with respect to any one sheet out of the optical disks included in the optical disk storage device for the first time, the use situation flag of the optical disk storage device is updated from 0 (without use history) to 1 (with use history). Thus, the use situation of the optical disk storage device can be properly grasped even from information of 1 bit. In other words, an optical disk storage device used (data were recorded) in the past in any library apparatus is identified to be "with use history". Also, when it is controlled according to a predetermined rule such that the optical disk storage device information is to be recorded in the optical disk of No. 1 of the optical disk storage device, and so on, the use situation of the optical disk storage device storing the optical device may be determined from the recording situation of the optical disk of No. 1 of the optical disk storage device. For example, when the optical disk of No. 1 is unrecorded, the optical disk storage device is determined to be "without use history".

Alternatively, when an optical disk storage device without use history is attached to a data library apparatus for the first time and identifying information of the optical disk storage device is successfully registered on a data base, the use situation flag of the optical disk storage device may be updated to "with use history". In this case, the use situation flag comes to indicate whether registration on the data base has been completed or not.

In step S1902, the use situation of the optical disk storage device attached is determined from the use situation flag of the optical disk storage device acquired in step S1901, the process proceeds to step S1903 when there is a use history, and the process proceeds to step S1905 when there is no use history.

Figure 20:
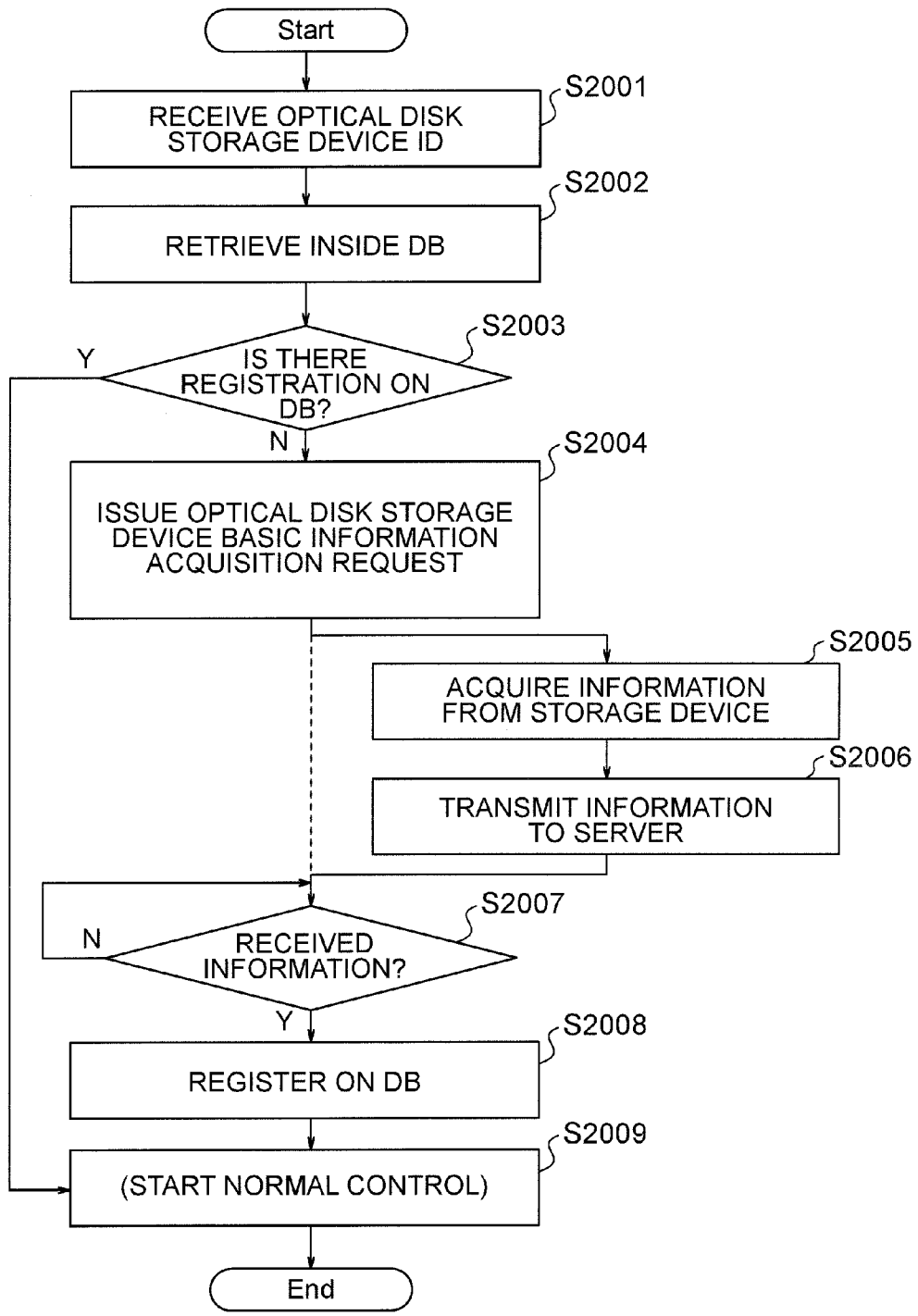
FIG. 20 is a process flowchart of a server when an optical disk storage device without a use history has been attached.

In step S1905, the event that the optical disk storage device attached is an optical disk storage device without use history and the identifying information for the optical disk storage device acquired in step S909 are notified. Step S1906 is a process on the side of the server that has received the notice of step S1905. The detail thereof will be described using FIG. 20. In step S2001, identifying information for the optical disk storage device is received from the data library apparatus. In step S2002, the data base is retrieved from the identifying information for the optical disk storage device received, and whether information related to the optical disk storage device attached has been registered on the data base is confirmed in step S2003. When the information has been registered already on the data base, the process proceeds to step S2009, and normal control as the server is started. For example, an instruction from a user is received and the process according to the instruction is executed, or alternatively, the state of each data library apparatus is monitored and the process such as properly responding according to the state is executed. On the other hand, when the information related to the optical disk storage device attached has not been registered on the data base, the process proceeds to step S2004. In step S2004, a request is raised to the data library apparatus so as to acquire basic information of the optical disk storage device. The data library apparatus having received the request acquires basic information of the optical disk storage device which is information of what kind of optical disks are stored by how many sheets and so on from the storage device in step S2005, and transmits the acquired information to the server in step S2006. In step S2007, the server confirms that the basic information of the optical disk storage device has been received from the data library apparatus. Upon receipt thereof, the process proceeds to step S2008, and the received information is registered on the data base. Thereafter, in step S2009, normal control as the server is started.

Figure 21:
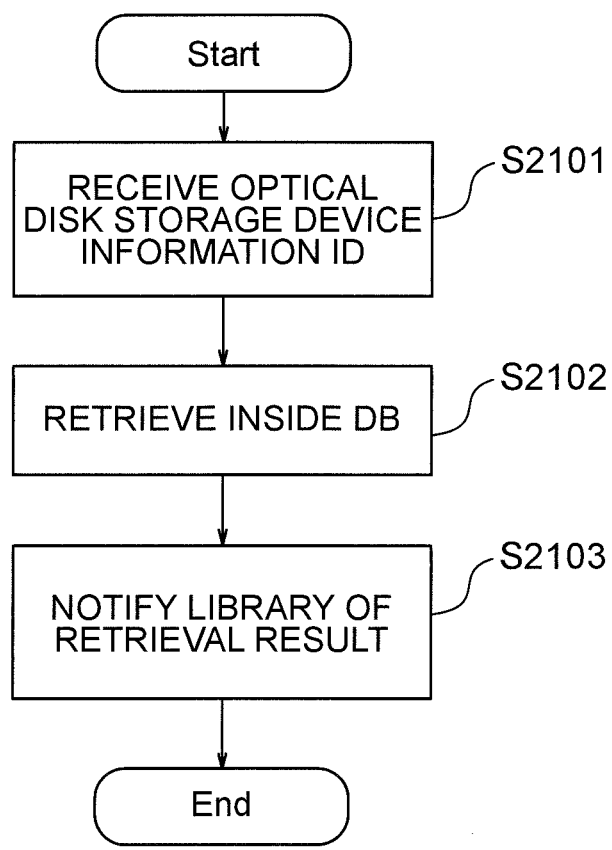
FIG. 21 is a process flowchart of a server when an optical disk storage device with a use history has been attached.

Returning to FIGS. 19A and 19B, in step S1903, the event that the optical disk storage device attached is an optical disk storage device with use history and the identifying information for the optical disk storage device acquired in step S906 are notified. Step S1904 is a process on the side of the server that has received the notice of step S1903. The details thereof will be described using FIG. 21.

In step S2101, the identifying information for the optical disk storage is received from the data library apparatus. In step S2102, the data base is retrieved from the identifying information for the optical disk storage device received, and in step S2103, the data library apparatus is notified of the result of retrieval of the data base which is the result of confirmation whether the information related to the optical disk storage device attached to the data library apparatus has been registered on the data base.

Figure 22:
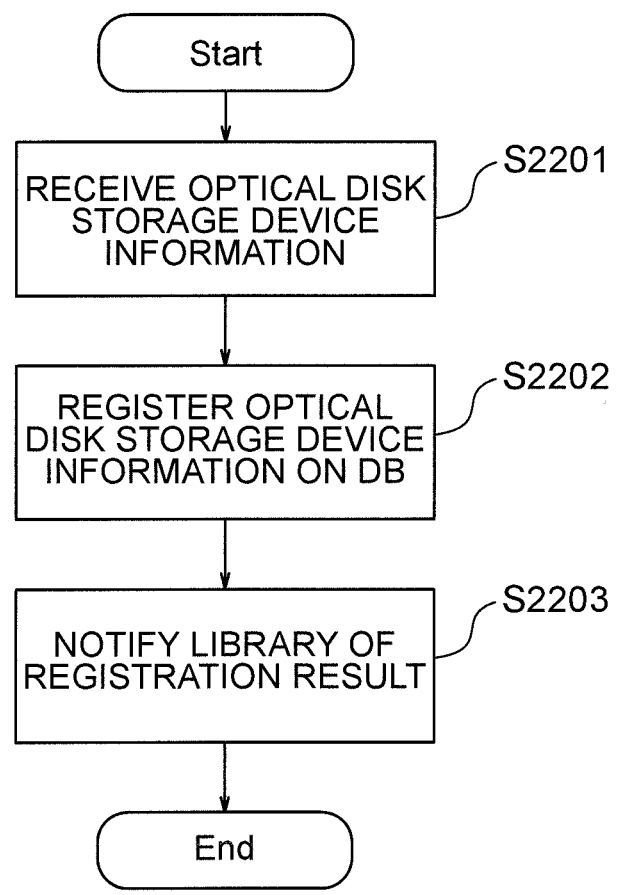
FIG. 22 is a process flowchart of a server when optical disk storage device information has been received.

Returning to FIGS. 19A and 19B, in step S1908, the registration state confirmation result of the data base is received, and, when information related to the optical disk storage device attached has not been registered on the data base, the process proceeds to step S1909. When the information related to the optical disk storage device attached has been registered, an optical disk storage device that has a use history and has been registered on the data base, that is, is known to the server and is properly controllable even without acquiring any additional information, comes to have been attached, therefore the process returns to step S901, and when the door is closed, the process is executed according to the command from the server. In step S1909, the optical disk storage device information recorded in an optical disk included in the optical disk storage device attached is read. The information read here is information written in the optical disk in step 1603 of FIG. 16 in detaching the optical disk storage device from the data library apparatus. At this time, unless in which optical disk put of the optical disks included in the optical disk storage device the optical disk storage device information has been recorded is known, the information cannot be read. The countermeasures therefor are as described above. As an example, by acquiring the number of the optical disk in which the optical disk storage device information has been recorded from the storage device included in the optical disk storage device attached, in which optical disk the optical disk storage device information has been recorded can be known, and therefore the optical disk storage device information can be read from the optical disk. In step S1910, the optical disk storage device information read in step S1909 is transmitted to the server. Further, although said transmittal is shown by one step in the drawing, it is also possible the information is transmitted dividedly into several times instead of transmitting all information at one time. Step S1911 is a process of the server having received the optical disk storage device information. Description will be made using FIG. 22.

In step S2201, the optical disk storage device information having been transmitted from the data library apparatus is received. In step S2202, the optical disk storage device information having been received is registered on the data base. Information registered then is such information as shown in FIG. 12. More specifically, the optical disk storage device information having been registered on the data base 1 is written in the optical disk, the optical disk storage device is detached from the data library apparatus 1, the optical disk storage device detached is attached to the data library apparatus 2, the optical disk storage device information is read out from the optical disk and comes to be registered on the data base 2, and the data base 2 comes to possess information same to that having been registered on the original data base 1. In step S2203, the data library apparatus is notified of the registration result onto the data base.

Returning to FIGS. 19A and 19B, in step S1912, the optical disk storage device information registration result onto the data base is received from the server, when registration succeeds, preparation for properly controlling the optical disk storage device attached comes to have been completed, therefore the process returns to step S1901, and when the door is closed, the process is executed according to the command from the server.

On the other hand, when the registration fails, the processes of step S908-step S911 are executed. As described above, these processes are for examining the contents of all optical disks included in the optical disk storage device attached, and for registering the examined result on the data base. As described above, because the time required for these processes is very long, these processes are executed only when the process for reading the optical disk storage device information from the optical disk and registering the same on the data base has failed. Also, when registration fails in step S1912, it is also possible for example to return to step S1909 again instead of proceeding to step S908, to read the information from the optical disk and to try registration again.

Further, although an example is shown in which information is acquired separately assuming that step S906 and step S1901 are separate from each other in FIGS. 19A and 19B, it is also possible to read out two kinds of information at one time. Also, some of respective steps in the flowchart of FIGS. 19A and 19B can be executed by either of the server or the data library from the server. For example, with respect to the use situation flag for the optical disk storage device acquired by the data library apparatus in step S1901, it is also possible to transmit only the acquired information to the server and to determine presence/absence of the use history of step S1902 by the server.

In the meantime, when registration of the optical disk storage device information on the data base succeeds, the optical disk in which the optical disk storage device information has been recorded is not required. To be more precise, when registration onto the data base is completed, normal operation starts as a data archive system, new data are thereafter recorded on the optical disk included in the optical disk storage device and so on, and thereby the situation of the optical disk storage device and the optical disk included therein comes not to agree to the optical disk storage device information recorded in the optical disk referred to in data base registration, the optical disk storage device information recorded in the optical disk does not correctly express the situation of the optical disk storage device, becomes old information, and therefore becomes unnecessary. Therefore, for example, when registration of the optical disk storage device information on the data base succeeds, the recorded contents of the optical disk in which the optical disk storage device information has been recorded may be deleted. Further, it is preferable to delete also, in parallel therewith, information stored in the storage device of the optical disk storage device or, for example, information that in which optical disk the optical disk storage device information has been recorded. Thus, the optical disk storage device information recorded in the optical disk which has already become old information cannot be referred to, and such risk of referring to old information and executing erroneous control is reduced.

Thus, even when information related to the optical disk storage device attached is not possessed by the data base, in the data archive system of the present application, by reading the optical disk storage device information recorded in the optical disk and registering the same on the data base, proper control can be executed even without examining the contents of all optical disks included in the optical disk storage device.

Up to here, an example was described in which, in detaching an optical disk storage device, information related to the optical disk storage device registered on the data base was written in an optical disk included in the optical disk storage device, and in attaching an optical disk storage device, information related to the optical disk storage device written in an optical disk included in the optical disk storage device was read and registered on the data base. However, in detaching an optical disk storage device, information registered on the data base and related to the optical disk storage device may be registered on the data base of the attaching destination by other means. For example, it is also possible that information related to the optical disk storage device is transmitted to the server of the attaching destination through a network, and is registered on the data base. Further, it is also possible to combine transmission of optical disk storage device information through a network and writing in and reading from the optical disk included in the optical disk storage device.

Figure 23:
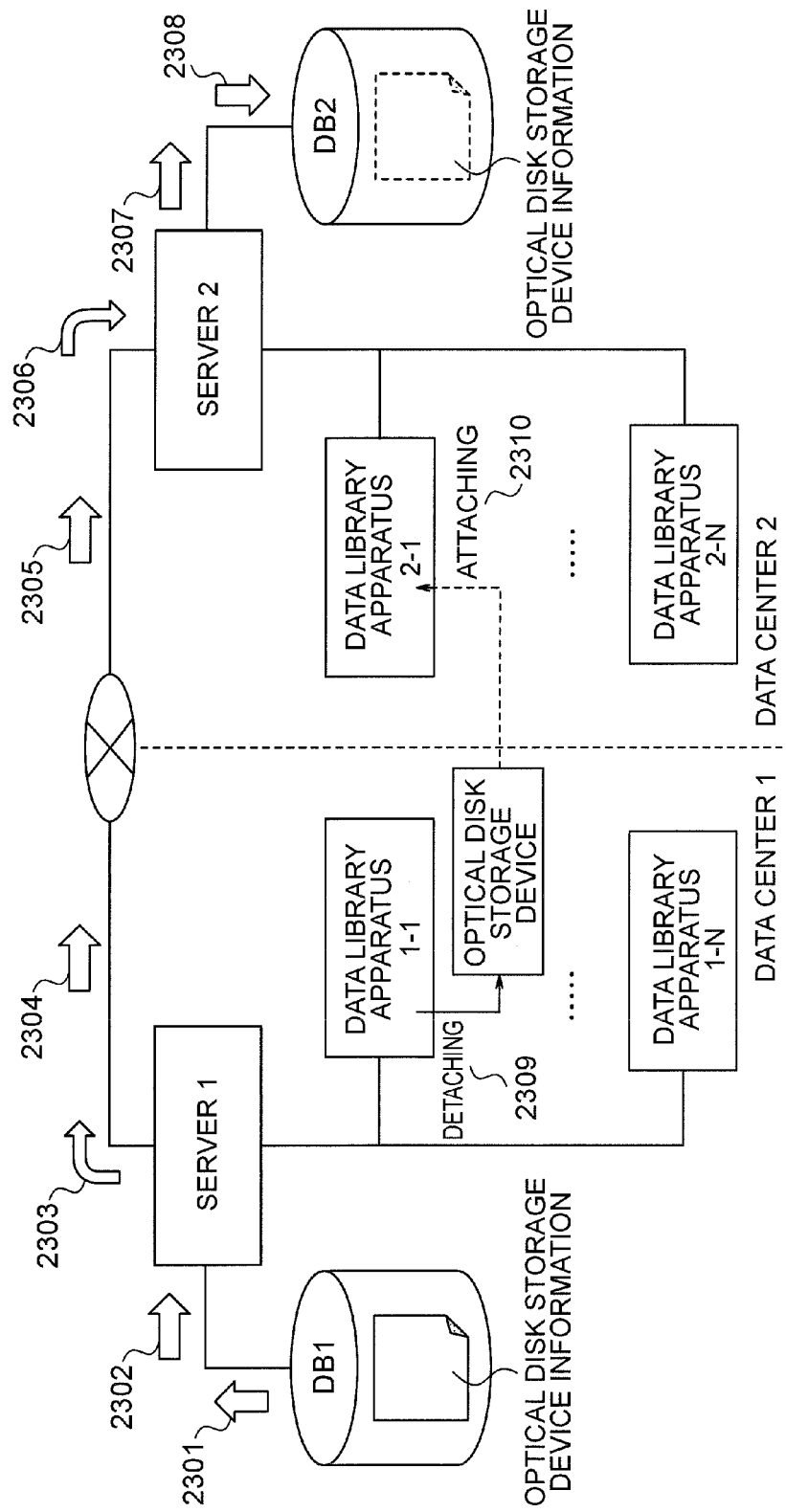
FIG. 23 is a drawing showing an example of an action in transmitting optical disk storage device information through a network.

FIG. 23 is a drawing showing an example of an action for transmitting optical disk storage device information through a network. First, in 2309 in the drawing, the optical disk storage device is detached from the data library apparatus 1-1 disposed inside the data center 1. At this time, the optical disk storage device detached is to be planned to be attached to the data library apparatus 2-1 of the data center 2 in 2310. At this time, the server 1 reads the information related to the optical disk storage device detached which has been registered on the data base 1 in 2301-2302, and transmits the same to the server 2 through the network in 2303-2306. At this time, even if the optical disk storage device information has been compressed, it is allowable. The server 2 receives the information having been transmitted and related to the optical disk storage device, and registers the received information on the data base 2 in 2307-2308. At this time, when the received information has been compressed, it is preferable to register the same on the data base after extending the same. When the information related to the optical disk storage device can be registered on the data base 2, in the data center 2, the optical disk storage device attached to the data library apparatus 2-1 can be properly controlled.

Further, here, although it was described that the server 1 read out the optical disk storage device information registered on the data base 1 and transmitted the same to the server 2, information held in another location may be transmitted as far as it is information same to the information transmitted. For example, because the information of the data base is indispensable for system control, it is effective to hold a backup at another location. Therefore, for example, the backup information held in the memory 302 included in the server 1 may be transmitted to the server 2. When information existing in the memory 302 is transmitted, because it is not necessary to read the information from the data base, the processing efficiency is excellent. Also, in the server 2, the received information is registered on the data base 2 after the information is once stored in the memory. At this time, even when registration onto the data base 2 has been completed, the received information may continue to be held in the memory as a backup. Alternatively, it is also possible that the received information is not registered on the data base 2 until correctness of the received information is confirmed, is kept to be held in the memory, and is registered on the data base 2 only after correctness of the information held in the memory has been confirmed.

The details of a means for confirming correctness of the received information will be discussed later.

Also, before registering the optical disk storage device information received on the data base 2, it is preferable to confirm the relationship between the optical disk storage device information received and the optical disk storage device attached to the data library apparatus 2-1. For confirmation of the relationship, the identification number of the optical disk storage device can be used. The optical disk storage device information includes the identification number of the optical disk storage device (FIG. 12). Also, in the storage device included in the optical disk storage device, the identification number has been stored. By using these two identification numbers, the relationship between the optical disk storage device information received and the optical disk storage device attached to the data library apparatus can be confirmed. Thus, for example, the optical disk storage device information having no relationship with the optical disk storage device attached to the data library apparatus can be prevented from being erroneously registered on the data base.

At this time, it is preferable that the optical disk storage device information has been registered on the data base 2 before the optical disk storage device is attached to the data library apparatus 2-1. For that purpose, for example, in the server 1, when an instruction to detach the optical disk storage device from the data library apparatus 1-1 is received from the user, information related to the optical disk storage device is read from the data base 1 and is transmitted to the server 2 through the network. When the server 2 registers the optical disk storage device information on the data base 2, the server 2 notifies the server 1 of the event. Upon receipt of the notice of the event that the optical disk storage device information has been registered on the data base 2, the server 1 makes the optical disk storage device detachable from the data library apparatus 1-1. Thus, when the optical disk storage device is attached to the data library apparatus 2-1, information related to the optical disk storage device attached comes to have been surely registered on the data base 2. Alternatively, it is also possible to attach the optical disk storage device after confirming that the information related to the optical disk storage device has been registered on the data base 2 when the optical disk storage device is attached to the data library apparatus 2-1 not when the optical disk storage device is detached from the data library apparatus 1-1. Alternatively, it is also possible that, after the optical disk storage device is attached to the data library apparatus 2-1, the event that the information related to the optical disk storage device has been registered on the data base 2 is confirmed, and control of the optical disk storage device is thereafter started. It is a matter of course that it is preferable that control can be executed without any problem regardless of whichever of attaching the optical disk storage device to the data library apparatus 2-1 or receiving the information of the optical disk storage device may come first. For that purpose, it is preferable that, when the optical disk storage device has been attached to the data library apparatus, the storage device included in the optical disk storage device is read first. In the storage device included in the optical disk storage device, information related to the optical disk storage device itself has been recorded as shown in FIG. 11 and FIG. 18, and therefore more precise control can be executed by reading the information. More specifically, when it can be determined that an optical disk storage device has not been used yet based on the use situation of the optical disk storage device, the optical disk storage device can start to be used after newly registering the optical disk storage device on the data base 2. The reason is that the fact the optical disk storage device has not been used yet means that the information has not been registered yet on both of the data base 1 nor on the data base 2. On the other hand, when it can be determined that the optical disk storage device has been already used, first, whether the optical disk storage device information exists in the data base 2 is confirmed. When the optical disk storage device information already exists in the data base 2 by receiving the information through the network and so on, the optical disk storage device can start to be used based on the information. When the optical disk storage device information does not exist in the data base 2, it may be possible to notify the event, and to request that the optical disk storage device information is to be transmitted from the server 1 to the server 2. Alternatively, when the optical disk storage device information does not exist in the data base 2, it may be possible also to read the optical disk storage device information from the optical disk of the optical disk storage device or the storage device included in the optical disk storage device, and to register the same on the data base 2.

Also, when the optical disk storage device information is transmitted from the server 1 to the server 2 through the network thus, the optical disk storage device information may be written in the optical disk included in the optical disk storage device. For example, when information is transmitted through a network, there is also a risk that data are garbled, or information cannot be transmitted properly, therefore it may be possible that the optical disk is made possess same information, when the optical disk storage device is attached to the data library apparatus 2-1, the optical disk storage device information written in the optical disk and the optical disk storage device information received through the network are compared to each other, and correctness of information of the both is examined. Also, information compared to the optical disk storage device information received through the network is not necessarily limited to information written in the optical disk, and, when the optical disk storage device information has been stored in the storage device included in the optical disk storage device for example, the optical disk storage device information received through the network may be compared to the optical disk storage device information written in the storage device included in the optical disk storage device.

Also, before the information is compared, it is preferable to confirm relationship between the optical disk storage device information received and the optical disk storage device. For confirmation of the relationship, the identification number for the optical disk storage device can be used. After confirming that the identification number for the optical disk storage device included in the optical disk storage device information received and the identification number for the optical disk storage device attached agree to each other, the optical disk storage device information received and the optical disk storage device information written in the optical disk (or other storage device) included in the optical disk storage device attached can be compared. Thus, there is no possibility of comparing information having no relationship at all, and efficiency of processing can be improved.

At this time, when the information agrees, if information received through the network is registered on the data base 2, the processing time can become shorter compared to that in reading from the optical disk. On the other hand, when the information does not agree, the information received through the network can be discarded, and the optical disk storage device information written in the optical disk can be read and registered on the data base 2. Alternatively, it is preferable to raise a request to transmit the optical disk storage device information again from the server 2 to the server 1 and to receive the optical disk storage device information again. As a result of receiving the optical disk storage device information again, when the information agrees, it is preferable to register the information received through the network on the data base 2, and when the information still does not agree, it is preferable to read the optical disk storage device information written in the optical disk and to register the same on the data base 2.

In the meantime, in the memory 302 of the server 2 and the hard disk 117 in which the data base exists, there should be empty capacity sufficient for receiving the optical disk storage device information and registering the information thereon. Therefore, for example, it is preferable to confirm that there is sufficient empty capacity before the information is transmitted from the server 1 to the server 2 and before the information received is registered on the data base.

Also, when the optical disk storage device is detached from the data library apparatus 1-1 and the optical disk storage device detached is attached to a data library apparatus 1-N inside the same data center 1, because both of the data library apparatus 1-1 and data library apparatus 1-N have been connected to the server 1 and information related to each apparatus has been registered on the data base 1, it is not necessary to transfer the optical disk storage device information through the network. In other words, when the optical disk storage device is detached and the attaching destination of the detached optical disk storage device is a data archive system in which information related to the detached optical disk storage device is not registered on the data base thereof, the information related to the detached optical disk storage device can be transferred through the network.

Also, the optical disk storage device information having been registered on the data base 1 may be deleted after confirming correct registration of the same onto the data base 2. When the optical disk storage device information has been registered on the data base 1, even when the optical disk storage device information may be deleted from the data base 1, the optical disk storage device information can be registered on the data base 1 again by transfer through the network or through the optical disk included in the optical disk storage device. Also, it is preferable that, even when the optical disk storage device information has been correctly registered on the data base 2, when there is a sufficient empty capacity in the hard disk 117 where the data base 1 is stored, the optical disk storage device information is not deleted from the data base 1, and, for example, when the empty capacity of the hard disk 117 has become a predetermined capacity or less, the optical disk storage device information having been registered already on the data base 2 is preferentially deleted rather than other data. Further, when a backup of the optical disk storage device information exists in the memory of the server 1, the backup information may be deleted from the memory and the information in the data base 1 may be kept without deletion, or the information in the data base 1 may be deleted and the backup information in the memory may be kept without deletion. On the other hand, in the server 2 also having received the optical disk storage device information, when the received information has been completely registered on the data base 2, the information in the memory of the server 2 may be deleted, or may not be deleted and be kept as a backup.

Also, with respect to functions of writing out the information on an optical disk storage device from the data base into the optical disk or transferring the same through the network in detaching the optical disk storage device, or reading the information on optical disk storage device from an optical disk and registering the same on a data base in attaching the optical disk storage device, or registering those having been transferred through the network, it is preferable that a user can freely select validity/invalidity of the functions. The reason is that, for example, in a case of a user possessing only one data base within one data center, even when the optical disk storage device is exchanged between plural sets of data library apparatuses, information of the optical disk storage device exists in the data base, and therefore a problem does not occur at all. It is a matter of course that, even in such user, there is also a case recording of information on the optical disk storage device in an optical disk included in each optical disk storage device as a backup for a data base for example is desirous, and the function can be made valid in the case. Also, in a case data continues to be archived constantly in the data center 1 and the archived data is made ready to be read anytime in the data center 2, the optical storage device recorded to the fullest capacity thereof in the data center 1 is detached and comes to be attached to the data library apparatus of the data center 2, and the present function is preferable to be kept valid in the case. Thus, when validity/invalidity of the function can be selected according to the use intended by a user, it eliminates a loss and is convenient. It is preferable that validity/invalidity can be switched from a user interface unit of the server for example.

Also, the present invention is not limited to the examples described above, and includes various alternatives. For example, the examples described above were described in detail for easy understanding of the present invention, and is not necessarily limited to that including all configurations described above. Further, a part of a configuration of a certain example can be substituted for a configuration of another example, and it is also possible to add a configuration of another example to a configuration of a certain example. Furthermore, with respect to a part of the configuration of each example, other configurations can be added, deleted and substituted.

Also, with respect to each configuration, function, processing unit, processing means and the like described above, a part or entirety thereof may be achieved by hardware by designing incorporating an integrated circuit and so on for example. Further, each configuration, function and the like described above may be achieved by software by that a processor interprets and executes a program that achieves the functions of each. Information of a program, table, file and the like achieving respective functions can be placed in a recording device such as a memory, hard disk, SSD (Solid State Drive) and the like, or in a storage medium such as an IC card, SD card, DVD and the like.

Also, with respect to control lines and information lines, those supposed to be necessary for explanation have been shown, and all of the control lines and information lines have not necessarily been shown in terms of the product. It is right in thinking that almost all constitutions are connected to each other in a practical sense.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data archive system comprising:
a plurality of data library apparatuses; and
a control unit and an information storing unit connected to the plurality of data library apparatuses, wherein
the data library apparatus comprises:
a recording medium storing unit that stores a plurality of recording media;
a data recording and reproducing device that records data in the recording media and reproduces data from the recording media;
a recording medium transporting unit that transports the recording media between the recording medium storing unit and the data recording and reproducing device; and
a data library apparatus control unit that controls an action of the data library apparatus;
the information storing unit stores management information for managing the recording medium storing unit;
the control unit controls actions of the total data archive system; and
when a recording medium storing unit is attached to the data library apparatus, the control unit executes control of reading identifying information for the recording medium storing unit in question from the recording medium storing unit and reading management information for the corresponding recording medium storing unit from the information storing unit based on the identifying information.

2. The data archive system according to claim 1, wherein the management information is information received from another archive system through a network.

3. The data archive system according to claim 1, wherein the recording medium storing unit comprises a storage device for storing information; and
the storage device stores the identifying information for the medium storing unit.

4. The data archive system according to claim 1, wherein the management information includes one or more of any of identifying information for the recording medium storing unit, number of sheet of recording media stored in the recording medium storing unit, and information showing details of identifying information for each recording medium or information recorded in each recording medium.

5. The data archive system according to claim 1, wherein the information storing unit that stores the identifying information is an internal recording medium of the control unit or an external storing medium accessible from the control unit.

6. The data archive system according to claim 1, wherein in the storage device included in the recording medium storing unit, use history information showing presence/absence of past use of the recording medium storing unit in question is stored; and
when the attached recording medium storing unit is one used in the past according to the use history information read from the storage device, the control unit executes control of reading management information of the corresponding recording medium storing unit from the information storing unit.

7. The data archive system according to claim 1, wherein when a recording medium storing unit is attached to the data library apparatus, the control unit reads identifying information for the recording medium storing unit in question from the recording medium storing unit, reads first management information for the corresponding recording medium storing unit from the storing device based on the identifying information, and compares second management information for managing the recording medium storing unit in question stored in the recording medium storing unit and the first management information to each other.

8. The data archive system according to claim 7, wherein as a result of comparing the first and second management information to each other, after confirming that contents of two kinds of information have agreed to each other, the recording medium storing unit is controlled based on the management information.

9. A data archive system in which a plurality of the data archive systems according to claim 1 are connected to each other through a network, wherein
when a recording medium storing unit is detached from a first data archive system and is attached to a second data archive system,
a first control unit of the first data archive system executes control so as to permit to detach the recording medium storing unit from the first data archive system after confirming that management information for the recording medium storing unit that becomes a detaching object is accessible from a second control unit of the second data archive system, and
the second control unit of the second data archive system executes control so as to permit to attach the recording medium storing unit to the second data archive system after confirming that management information for the recording medium storing unit that becomes an attaching object is accessible.

* * * * *